US011449241B2

(12) United States Patent
Perumal et al.

(10) Patent No.: US 11,449,241 B2
(45) Date of Patent: Sep. 20, 2022

(54) CUSTOMIZABLE LOCK MANAGEMENT FOR DISTRIBUTED RESOURCES

(71) Applicant: Amazon Technologies, Inc., Seattle, WA (US)

(72) Inventors: Saravana Perumal, Bangalore (IN); Abhijit Chaudhuri, Bangalore (IN); Mahesh H. Dhabade, Bangalore (IN); Vivek Yadav, Faridabad (IN); Nagaprasad K P, Tumkur (IN); Rahul Kamalkishore Agrawal, Bandalore (IN); Pankaj Chawla, Bandalore (IN); Visakh Sakthidharan Nair, Bandalore (IN)

(73) Assignee: Amazon Technologies, Inc., Seattle, WA (US)

( * ) Notice: Subject to any disclaimer, the term of this patent is extended or adjusted under 35 U.S.C. 154(b) by 7 days.

(21) Appl. No.: 16/938,846

(22) Filed: Jul. 24, 2020

(65) Prior Publication Data

US 2021/0382636 A1 Dec. 9, 2021

(30) Foreign Application Priority Data

Jun. 8, 2020 (IN) ............................ 202041023985

(51) Int. Cl.
*G06F 3/06* (2006.01)

(52) U.S. Cl.
CPC ............ *G06F 3/0622* (2013.01); *G06F 3/067* (2013.01); *G06F 3/0655* (2013.01)

(58) Field of Classification Search
None
See application file for complete search history.

(56) References Cited

U.S. PATENT DOCUMENTS 6,389,420 B1 5/2002 Vahalia et al.
7,765,186 B1 7/2010 Hu et al.
7,962,458 B2 6/2011 Holenstein et al.
9,400,829 B2 7/2016 Shadmon
9,658,899 B2 5/2017 Jenkins
10,924,587 B1 2/2021 Chaudhuri et al.
10,979,303 B1 4/2021 Carr et al.
2010/0017409 A1* 1/2010 Rawat ................ G06F 16/1774 707/E17.007
2010/0161573 A1* 6/2010 Chan .................. G06F 16/2343 707/704

(Continued)

OTHER PUBLICATIONS

U.S. Appl. No. 15/930,332, filed May 12, 2020, Raghavendra Mohan Dani, et al., Amazon Technologies, Inc., application pp. 1-66 and drawing pp. 1-27.

(Continued)

*Primary Examiner* — Edward J Dudek, Jr.
*Assistant Examiner* — Ralph A Verderamo, III
(74) *Attorney, Agent, or Firm* — Robert C. Kowert; Kowert, Hood, Munyon, Rankin & Goetzel, P.C.

(57) ABSTRACT

A write lock request for a data object on behalf of a first data accessor is received at a lock manager. The data object is currently locked on behalf of a second data accessor. The lock manager modifies lock metadata associated with the data object to indicate the first data accessor as the primary lock owner, and designates the second data accessor as a non-primary owner.

20 Claims, 12 Drawing Sheets

(56) References Cited

U.S. PATENT DOCUMENTS

| | | | | |
|---|---|---|---|---|
| 2010/0274772 | A1* | 10/2010 | Samuels | G06F 16/188 707/693 |
| 2013/0007090 | A1* | 1/2013 | Sankararaman | G06F 11/202 709/201 |
| 2013/0060742 | A1* | 3/2013 | Chang | G06F 16/2379 707/704 |
| 2016/0154817 | A1* | 6/2016 | Mason, Jr. | G06F 16/1774 707/704 |
| 2016/0371156 | A1 | 12/2016 | Merriman | |
| 2018/0234503 | A1* | 8/2018 | Lan | G06F 15/177 |
| 2020/0280613 | A1* | 9/2020 | Baldassarre | H04L 67/1095 |

OTHER PUBLICATIONS

U.S. Appl. No. 16/434,094, filed Jun. 6, 2019, Carr, et al., Amazon Technologies, Inc., application pp. 1-75 and drawing pp. 1-16.

* cited by examiner

CUSTOMIZABLE LOCK MANAGEMENT FOR DISTRIBUTED RESOURCES

BACKGROUND

This application claims benefit of priority to Indian Patent Application No. 202041023985, filed on Jun. 8, 2020 entitled "CUSTOMIZABLE LOCK MANAGEMENT FOR DISTRIBUTED RESOURCES", which is hereby incorporated by reference in its entirety.

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed computing environment may provide remote clients with access to various data stores (e.g., database instances implementing various data models such as the relational model, NoSQL models, and the like), which can all be accessed over network connections. The data stores may vary in their performance, availability, storage capacity, cost, and other characteristics. In many applications, under some circumstances, it may be the case that respective versions of a given data object or record can be stored at several different data stores. For example, during a migration of a data set from one data store to another, one version of the data object may remain at a source data store while another version is written to a different data store. Maintaining data consistency without sacrificing efficiency in such distributed computing environment remains a non-trivial technical problem.

Figure 1:
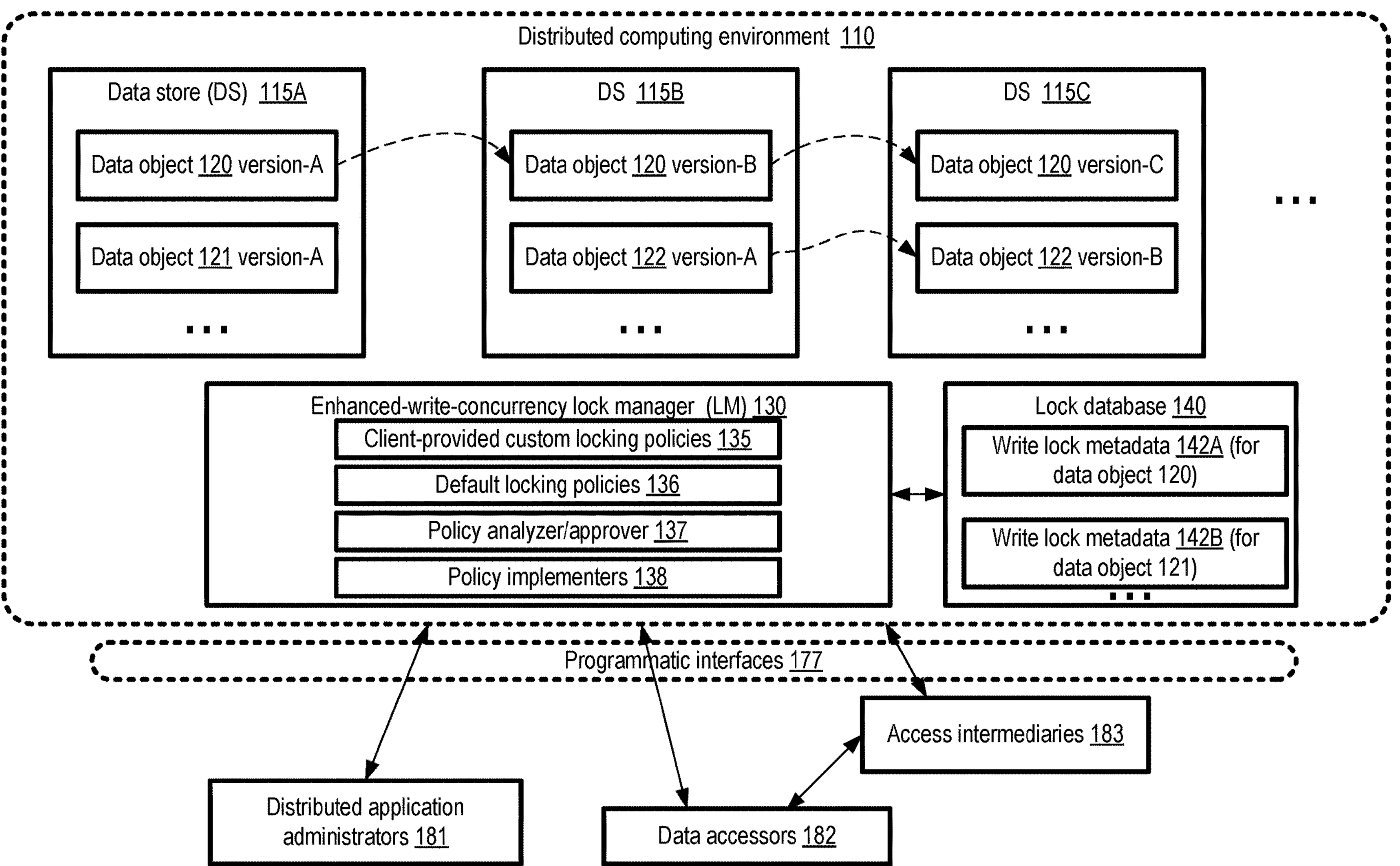
FIG. 1 illustrates an example system environment in which a lock manager may implement enhanced write concurrency techniques based on client-provided locking policies, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for customizable lock management techniques which enable sharing of write locks under certain conditions in distributed computing environments, and which thereby safely increase overall application performance and availability for applications while also reducing lock management overhead. Some distributed computing environments or systems may include multiple data stores at which respective versions of a given data object may be stored. For example, during a live migration of a data set comprising a plurality of data records from one database to another, different versions of a record may be stored at least temporarily at both the source database (from which the records are being migrated) and a destination database (to which the records are being migrated). When a given data object is to be updated by a data accessor such as an application program, a lock request for the data object may be submitted to a lock manager, indicating the particular target data store at which the update is intended to be performed by the accessor if the write lock is granted. If the lock is granted, the accessor may submit a write request to the targeted data store, and release the lock after the update is complete.

In a distributed system, different data accessors may run at respective resources (e.g., as processes within respective computer hosts) linked to the lock manager and the data stores via network paths, and the resources as well as the network paths may in general be susceptible to unpredictable errors/bugs and/or periods of sub-optimal performance (such as garbage collection-related pauses for heap memory management). As a result of errors and/or sub-optimal performance periods, a data accessor may not be able to release a write lock for a non-trivial amount of time after the write lock is acquired; in some rare cases, e.g., if the data accessor crashes or hangs, the accessor may never be able to release the lock at all. Other accessors which intend to write to the locked data object may therefore be unable to make progress when some conventional exclusive write locking techniques are used and locks are held for long time periods. In order to overcome such problems, respective validity periods may be assigned to write locks in some locking techniques, indicating that if the holder of an exclusive write lock does not free up the lock in a specified time period, the lock manager may cause the lock holding data accessor to be terminated/restarted and release the lock to enable other accessors for the same data object to make progress. However, in many cases (e.g., when the garbage collection cycle which caused the delay in releasing the lock completes, or after a temporary network problem has been resolved) the owner of the lock may eventually be able to resume its normal behavior. As such, the termination or restart of such a data accessor may represent an unnecessarily harsh penalty, with non-trivial performance overhead and reduction in availability of the applications being run at the data accessor. Even in scenarios in which the owner of the lock would not have resumed its normal behavior on its own (such as hangs caused by bugs), so the harshness of the penalty associated with termination/restart is not an issue, the unnecessarily long periods for which other accessors have to wait before they can make progress may still represent a significant problem. Furthermore, requiring the lock manager to keep checking whether validity periods of locks have expired, as is expected in some conventional locking techniques, may impose a substantial overhead on the lock manager itself, especially in environments in which locks on hundreds of thousands (or millions) of data objects have to be managed.

In order to help overcome these types of problems, customizable and novel lock management techniques which support conditional co-ownership of write locks, and which do not require lock managers to repeatedly check for expired locks, may be implemented in various embodiments. According to at least some embodiments, a client of a lock manager may indicate a locking policy to be implemented by the lock manager with respect to a specified data set and a collection of data stores of a distributed computing environment. A respective version of a given data object may be resident at one or more of the data stores at a given point in time in some embodiments. The locking policy may indicate one or more rules and/or preferences of the client with regard to the manner in which locks are to be granted, and the manner in which data consistency is to be maintained in the distributed computing environment. For example, the locking policy may indicate the elements of context information (e.g., the target data store, write sequencing information such as a proposed new version number of the data object which is to be updated, etc.) expected in a write lock request, a rule that write locks directed to a given data object are not to be granted with respect to more than one data store at a time, the conditions (if any) under which write locks can be granted to multiple owners concurrently, the set of lock metadata to be provided by the lock manager in response to lock requests, etc. When a lock request for a data object is received on behalf of a data accessor A1 at a lock manager, and the data object is currently locked by a different data accessor A2, lock metadata (such as the validity period or expiration time of A2's lock) of the data object may be provided by the lock manager to the lock requester in at least some embodiments.

The lock metadata may be used by (or on behalf of) A1 to determine whether the lock can be acquired concurrently in various embodiments—e.g., based on the locking policy, a currently-granted lock may be co-granted to another accessor of the current lock's validity period has expired. The lock request may be re-submitted to the lock manager in some embodiments if the conditions for co-ownership of the lock are satisfied. In response, the lock manager may modify the metadata associated with the lock to indicate that A1 has been made the primary owner of the lock (with a new validity period), with A2 now designated as a non-primary owner. Note that the lock manager may not cause A2 to be terminated or re-started in at least some embodiments when such lock sharing is initiated. The new primary owner of the lock, A1, may then submit a write request to the targeted data store, and thus the application being run at A1 may make progress even though the prior owner of the lock A2 has not yet released the lock. Write requests from A1 (and A2, if A2 submits any write requests) may be processed at the targeted data store in accordance with consistency rules of the individual data stores—e.g., in some data stores, each write request may have to be submitted with a corresponding write sequence indicator such as a proposed version number of the targeted data object, and writes may only be committed in sequence or version order. If A1 later submits a request to release its lock, the lock manager may use the locking policy to determine which (if any) other non-primary owners' locks (such as A2's lock) can be released, and may modify the lock metadata accordingly in various embodiments. If A2 submits a request to release its lock, and its lock has already been released, the lock manager may simply provide a response to A2 indicating that its lock has been successfully released in some embodiments. In some embodiments, if a lock request is directed to a given data object with respect to a different target data store than the data store for which a lock has already been granted on the same data object, and the locking policy permits a switch of target data stores, the lock manager may grant the write lock for the data object after changing the target data store, thus enabling the new lock requester to make progress.

As one skilled in the art will appreciate in light of this disclosure, certain embodiments may be capable of achieving various advantages, including some or all of the following: (a) increasing the availability of data accessor applications in distributed computing environments, e.g., by preventing or avoiding early terminations of the data accessors in scenarios in which the data accessors are unable to release locks in a timely manner, (b) increasing the overall performance of data accessors which write data objects, e.g., by reducing the time periods for which the write accessors have to wait for write locks, and by automatically switching target data stores based on currently-granted locks when locking policies permit such changes, (c) increasing the overall performance of lock managers, e.g., by avoiding the need for persistent lock expiration checks, and by passively releasing locks when permitted by locking policies and/or (d) simplifying the development and management of applications with varying concurrency control needs by supporting customizable locking policies at a single lock manager, so that application designers can use a single set of programmatic interfaces for locking-related interactions instead of having to customize code for different lock managers.

In some embodiments, the customizable locking techniques described above may be implemented at a network-accessible locking service of a provider network. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as a locking service implementing customizable locking techniques. A VCS may also be referred to as an elastic compute service, virtual machines service, computing cloud service, compute engine, and/or cloud compute in various implementations.

A locking service of a provider network may implement one or more programmatic interfaces in some embodiments, such as a web-based console, application programming interfaces (APIs), command-line tools, graphical user interfaces and the like, any of which can be used by clients or users of the locking service to submit requests and receive responses. At least two types of interactions may be supported by the locking service in various embodiments: policy-related interactions and lock-related interactions. In policy-related interactions, application owners or administrators may, for example submit, view or modify locking policies applicable to various data sets at various data stores of a distributed computing environments, provide an indication of when a given data store is to be considered an authoritative data store for future operations, and so on. In lock-related interactions, data accessors (or intermediary programs such as request routers of the kind discussed below) may submit lock or unlock requests for data records or objects. Locks may be acquired and/or released on data objects at various granularities defined in the locking policies in some embodiments: e.g., at the record or row level, at the column or attribute level, at the table level and so on.

According to some embodiments, a system may comprise one or more computing devices. The computing devices may include instructions that upon execution on or across the one or more processors cause the one or more processors to obtain an indication, via one or more programmatic interfaces of a locking service of a provider network, of a locking policy for a plurality of data stores of a distributed computing environment. The locking policy may, for example, indicate one or more criteria for granting co-ownership of a write lock. In at least one embodiment, the locking policy may require that validity periods for write locks be stored in write lock metadata, and the criteria for granting co-ownership may be based on validity period expirations.

A write lock request, directed to a data object on behalf of a particular data accessor, and indicating a first data store as the target data store with respect to which the data object is to be locked, may be received at a lock manager implemented at the computing devices. The target data store may, for example, be indicated in a parameter of the lock request referred to as a "context" parameter in some embodiments; in at least one embodiment, the context parameter may also indicate a proposed write sequence indicator corresponding to a proposed write to be attempted if the lock is granted. If the lock manager determines that the data object is unlocked, the particular accessor may be designated as a primary owner of a write lock on the data object in various embodiments. Lock metadata associated with the data object may be stored by the lock manager. The lock metadata may comprise one or more elements, depending on the locking policy: for example, in some embodiments, an element of the metadata may indicate the particular accessor as the primary owner, and another element may indicate a validity period for the primary ownership. Validity periods may, in some implementations, be indicated by an expiration time. The logical equivalent of the following may be indicated in the metadata in such implementations: "the current primary owner is to be considered the primary owner of this lock up to expiration time T1, after which the lock may be released or shared with other data accessors."

In response to another write lock request directed to the same data object on behalf of another data accessor, received prior to a release of the lock, the lock manager may transmit at least a portion of the lock metadata associated with the data object to the requester in various embodiments. This may be done regardless of whether the validity period has expired or not in at least some embodiments; that is, in such embodiments, the lock manager may not be required to keep checking whether the validity periods of various locks have expired or not. The requester of the second write lock, which may be aware of the validity period-based criteria to be used at the lock manager for granting co-ownership of locks, may examine the transmitted lock metadata to check whether the validity period has expired or not in various embodiments.

The write lock request on behalf of the second data accessor may be re-sent to the lock manager based at least in part on a detection of an expiration of the validity period in some embodiments. In some cases, a different programmatic interface may be used for a re-submitted lock request than for the original lock request, or a parameter of the lock request may indicate that it is a re-submission. Based at least in part on the locking policy, in some embodiments the lock manager may modify the lock metadata to indicate (a) that the second data accessor is now the primary owner of the write lock on the data object (b) the first data accessor is now a non-primary owner of the write lock and (c) a new validity period of the primary ownership of the write lock. The lock manager may transmit an indication that the second data accessor is permitted to submit a write request directed to the data object in the first data store in various embodiments.

Note that the second data accessor may thus be permitted to proceed with its operations even though the first data accessor has not been terminated (and may be unaware that the write lock is being shared). Based on the locking policy, the lock manager may not be required to cause the existing primary owner to be terminated in order to grant the primary ownership to a new owner in various embodiments. If a write operation directed to the data object is sent to the first data store by the first accessor after a write operation requested by the second data accessor has been committed or applied, the first data store may reject the write of the first accessor based for example on an invalid write sequence indicator in some embodiments in which write sequence indicators are used to determine whether a given write is applied at a data store.

A locking policy may indicate the rules for freeing co-owned write locks in at least some embodiments. For example, in one embodiment, the locking policy may require that (a) write sequence indicators (analogous to proposed version numbers of the data object being locked) be included in write lock requests and in the lock metadata stored for the data objects and that (b) when a request to release a lock is received from the primary owner of the lock, indicating that the primary owner has successfully updated/written the data object, the lock should also be released on behalf of all non-primary owners whose write sequence numbers are smaller than the write sequence number of the primary owner. The intuition behind such a release rule is that if the write sequence indicator WSIp of the primary owner is higher than the write sequence indicator WSInp of a non-primary owner, and the write of the primary owner has succeeded, the targeted data store would in any case reject the non-primary owner's write request (because WSIp>WSInp), so there is no longer any need to store metadata indicating that the non-primary owner is permitted to write the data object. The metadata indicating the non-primary owners with smaller WSIs than the primary owner may thus be deleted, in effect terminating the write lock ownership of the non-primary data accessors without terminating the non-primary data accessors themselves. A lock release policy of this kind may be referred to as an unrequested release policy, as the lock manager is permitted to release locks of the non-primary owners without receiving corresponding lock release requests from the non-primary owners.

In at least one embodiment, a locking policy may include a target data store switching rule. The target data store switching rule may allow the lock manager to grant a lock on a data object with respect to a different target data store than the one indicated in the lock request under some circumstances. Thus, for example, if a lock request for data object DO1 within target data store TDS1 is received on behalf of a data accessor A1 is received at a point in time in which DO1 is locked for writing within a different target data store TDS2, the lock manager may be permitted in some embodiments to grant a write lock to A1 on DO1 within TDS2 (not TDS1 as requested). This approach, which may be used for example in data migration scenarios, may allow A1 to make progress while also ensuring that the data in the source and destination data stores of the migration remains consistent. For example, from the perspective of A1, it may not matter whether a given write is directed to a source data store of the migration, or the destination data store, as long as the write is eventually propagated to the destination data store. In some embodiments, such target data store switching may not be permitted by a locking policy.

Example System Environment

FIG. 1 illustrates an example system environment in which a lock manager may implement enhanced write concurrency techniques based on client-provided locking policies, according to at least some embodiments. As shown, system 100 comprises resources and artifacts of a distributed computing environment comprising a plurality of data stores (DSs) 115 (such as 115A, 115B and 115C), an enhanced-write-concurrency lock manager 130 and a lock database 140. Each of the data stores 115 may be used to store a plurality of data objects in the depicted embodiment, such as data object 120, 121, or 122. The data stores may be implemented using a geographically distributed collection of physical and/or virtual computing devices in some embodiments. Within the distributed computing environment 110, respective versions of a given data object may be stored (e.g., either concurrently, or at different points in time) at several different data stores in some cases. For example, version A of a data object 120 may be stored at DS 115A, version B may be stored at DS 115B, while version C may be stored at DS 115C. Similarly, version A of data object 122 may be stored at DS 115B, while version B may be stored at DS 115C. Some data objects may have only one version resident in the data sets at a given point in time (e.g., data object 121A). In some embodiments, as discussed below in further detail, a data set comprising a plurality of data objects may initially be stored at a given data store, and then transferred or migrated to a different data store using a live migration procedure, during which multiple data stores may temporarily store respective versions of a given data object. In other embodiments, the data stores may be used to store data objects at different stages of their life cycles—e.g., newly created data objects which are expected to be accessed very frequently may be stored at one data store, and then less-frequently-accessed data items may transferred to other data stores as they age.

The lock manager (LM) 130 may implement a variety of locking policies in different embodiments with respect to the data objects and the data stores. One or more programmatic interfaces 177 (e.g., web-based consoles, command-line tools, APIs, or graphical user interfaces) may be used by clients of the LM 130 to submit configuration or policy-related requests and/or to submit requests to lock and/or unlock data objects. At least two broad categories of clients may interact with the LM 130 using programmatic interfaces 177 in the depicted embodiment: distributed application administrators 181, and data accessors 182. The distributed application administrators may, for example, submit messages via interfaces 177 to create, view or modify client-provided custom locking policies 135 applicable to respective sets of data objects at one or more data stores 115. Data accessors may submit (or re-submit) requests to lock or unlock data objects, e.g., within or with respect to one or more target data stores in the depicted embodiment. In some embodiments, one or more access intermediaries 183, such as request routers of a migration system, may interact with the LM 130 on behalf of data accessors 182. For example, in one embodiment, each write lock request may have to be sent with a respective write sequence indicator (WSI) or version number, which can be used by the LM 130 for determining when certain locks can be released without corresponding release requests, and the access intermediaries may assign the WSIs to the lock requests.

In the depicted embodiment, the LM 130 may implement at least two types of locking policies on behalf of clients: custom locking policies 135, as well as default locking policies 136. A given locking policy may indicate, for example, some combination of the following elements: a list of data stores 115 and data objects to which it is applicable, a set of authorized data accessors 182 on behalf of whom data objects are to be locked/unlocked, criteria or rules to be used to grant write locks concurrently to multiple accessors, criteria or rules to be used to release locks without corresponding release requests, criteria or rules to be used to switch target data stores when granting locks, the set of lock metadata elements to be stored for data objects and/or transmitted to lock requesters, the context information (e.g., target data store, WSI, etc.) expected to be provided in lock/unlock requests, and so on. A client may customize some aspects of a locking policy, while leaving other aspects set at default settings of the LM 130; the default settings of policies 136 may be used if a client does not wish to specify custom settings. The LM 130 may comprise one or more policy analyzers/approvers 137, implemented at one or more computing devices, configured to perform analysis of custom locking policies submitted by clients in some embodiments, e.g., to ensure that the policies are internally consistent and implementable before accepting a policy. In various embodiments, the LM 130 may include one or more policy implementers 138, comprising one or more software and/or hardware devices which respond to lock requests and lock release requests in accordance with the policies 135 and/or 136.

When a request for a write lock (or a request to release a write lock) is obtained at the LM 130 from a data accessor 182 or an access intermediary 183, the parameters of the request may be checked to determine the data object and data store to which it is targeted, and an applicable locking policy may be identified by a policy implementer 138. Depending on the policy and the state of the locking metadata stored in lock database 140 for the target data object, the lock request may be granted or rejected. Note that although write locks are the focus of this document, an LM 130 may also be used to manage read locks in some embodiments. When an accessor is granted a write lock, it may then proceed to submit a separate write request to the targeted data store 115 for which the lock was granted in the depicted embodiment. The data store may accept the write request, or, depending on the data store's own decision-making logic, reject the write request in some embodiments. As such, in at least some embodiments, the acquisition of a write lock by a data accessor may be a necessary condition for requesting a corresponding write operation, but may not be a sufficient condition for successfully completing the write operation. For example, in some embodiments, due to delays resulting from operations such as garbage collection pauses and the like, a data accessor may submit a write request with a particular WSI after the lock request for the targeted data object was obtained from the LM, and the write request may be rejected at the target data store if a write with a higher WSI has already been committed or applied to the data object. In at least some embodiments, a write request to a data store may be required to include evidence that the corresponding write lock has been acquired by the requester of the write.

In some embodiments, a given granted write lock may have one primary owner and zero or more non-primary owners at a given point in time, with all the owners being indicated in write lock metadata 142 (e.g., metadata 142A for data object 120, or metadata 142B for data object 121). According to one locking policy, the lock metadata 142 may also include a validity expiration time for the primary ownership of the lock, and/or a WSI specified by each co-owner in their respective lock request. When such a locking policy is enforced, a data accessor may be granted primary write lock ownership if (a) the targeted data object for which the lock is requested is not locked currently for writes or (b) the targeted data object is currently locked for writes but the validity period of the lock has expired. In at least some embodiments, when a write lock is received at the LM 130 and the targeted data object is already locked, the LM 130 may reject the lock request and transmit at least a portion of the metadata 142 in the rejection message.

The data accessor or the access intermediary may be responsible for checking the metadata to determine whether the validity period of the lock has expired in such an embodiment, and if so, the write lock may be re-sent to the LM 130. The LM itself may not be required to keep checking the validity of various granted locks (of which there could be millions in some large-scale distributed computing environments). In response to the re-sending of the request, the LM 130 may verify that the validity period has indeed expired, and modify the metadata 142 to indicate that (a) the data accessor which re-sent the request is now the primary owner and (b) the data accessor which was previously the primary owner is now designated as a non-primary owner. The LM 130 may take no action to terminate or restart the non-primary owner, or even inform the non-primary owner of its change of ownership status in the depicted embodiment. A new validity period for the primary ownership may also be determined and stored in the metadata 142. The new primary owner may then be informed that it is permitted to send a write request to the target data store in various embodiments, thus enabling it to make progress.

In some embodiments, the data accessor or access intermediary may not have to check the lock metadata and re-send a lock request. Instead, based on the locking policy in use, the lock manager may check whether concurrent lock granting rules/criteria of the locking policy are satisfied when a write lock request is received from an additional data accessor for a currently-locked data object (e.g., if the validity period of the current primary owner's lock has expired). Primary ownership of the write lock may be granted to the additional data accessor if the criteria are satisfied, and the earlier primary owner may be designated as a non-primary owner, without requiring re-sending of the write lock request in such embodiments.

If/when a request to release a lock is obtained from a particular data accessor, the LM 130 may check (in accordance with the applicable locking policy) whether just the metadata indicating the particular data accessor's ownership is to be deleted, or whether there are any other owners whose ownership metadata can also be deleted, in effect releasing the locks passively for the other owners in the depicted embodiment. This approach may help to reduce the overhead associated with lock releases. In some embodiments, the locking policy may allow the LM 130 to grant a lock with respect to a different target data store than the one to which the corresponding lock request was directed—e.g., if a write lock is already held with respect to a data object in DS 115A and has expired, and a write lock request for the same data object in DS 115B is received, the requester may be granted the lock request with respect to DS 115A rather than with respect to 115B. This target data store switching technique may ensure that inconsistent versions of the same data object are not stored at different data stores.

Example Migration Scenario

Figure 2:
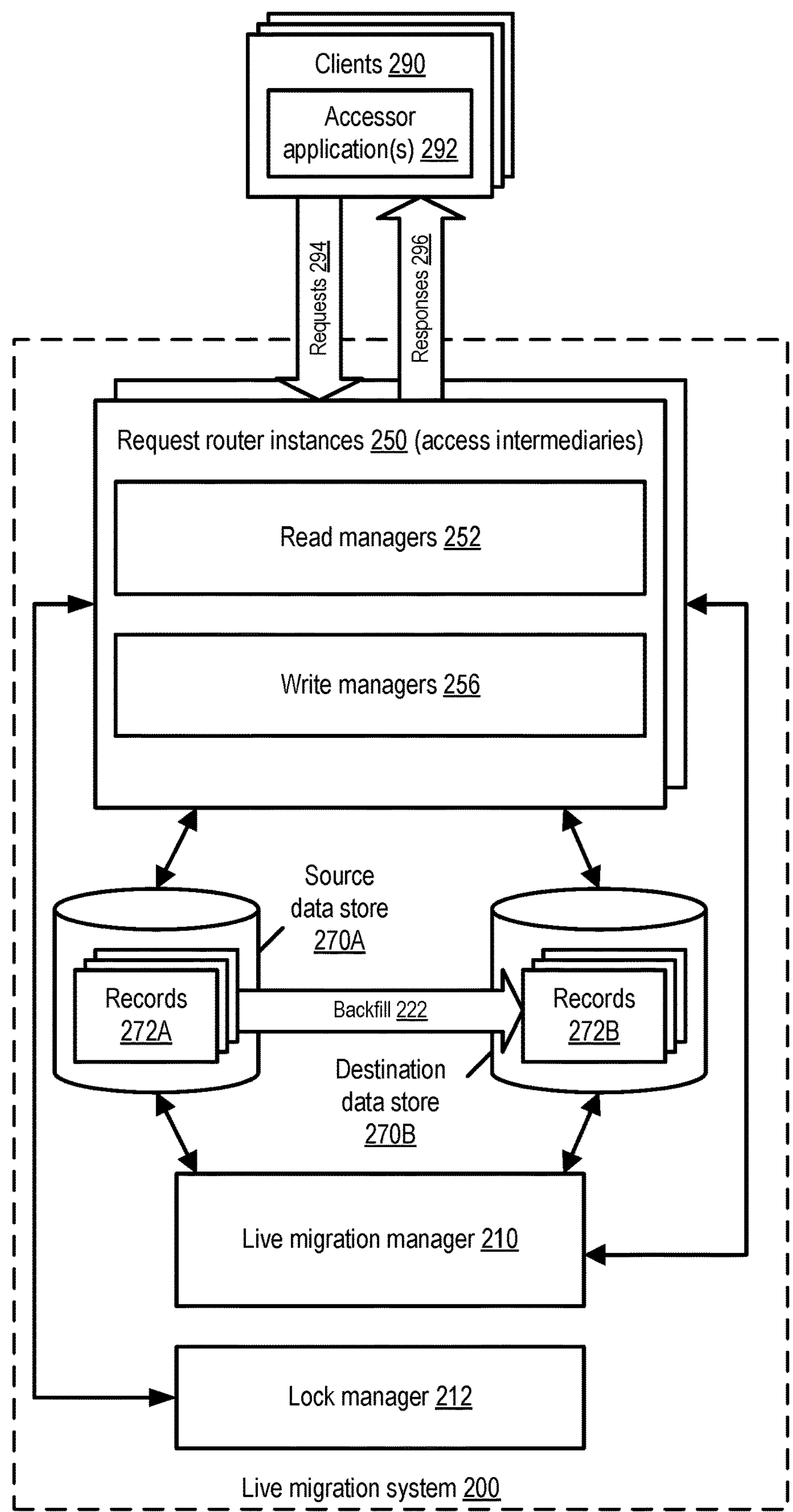
FIG. 2 illustrates an example scenario in which enhanced locking techniques may be employed for live migrations of data sets among data stores, according to at least some embodiments.

FIG. 2 illustrates an example scenario in which enhanced locking techniques may be employed for live migrations of data sets among data stores, according to at least some embodiments. A live migration system 200, representing one example of a distributed computing environment similar to environment 110 of FIG. 1, may enable a data set to be migrated from one data store (a source 270A) to another data store (a destination 270B) while permitting reads, writes, and deletes from client accessor applications 292 during the migration via a set of request routers 250 (which may represent an example of the access intermediaries 183 of FIG. 1). The writes may be implemented in a consistent manner in accordance with a locking policy enforced by lock manager 212, similar in features and functionality to LM 130 of FIG. 1. The live migration system 200 may minimize or eliminate application 292 downtime. The live migration system 200 may maintain the high availability of the source data store 270A and/or destination data store 270B during a migration. A plurality of data stores such as the source data store 270A and destination data store 170B may each offer storage of records, potentially using different underlying storage technologies, architectures, and/or resource types to store data. The data stores 270A-270B may be accessible via different APIs in some embodiments. The data stores 270A-270B may be hosted in the same or different geographical regions or network zones. In one embodiment, the data stores 270A-270B may include NoSQL data stores. In one embodiment, the data stores 270A-270B may include non-relational key-value data stores that store key-value pairs. In one embodiment, the data stores 270A-270B may include relational data stores.

Components of the live migration system 200, such as a live migration manager 210 and a fleet of live request routers 250, may be used during migrations but may not be used by client applications 292 when migrations are not active. In one embodiment, an application 292 may be modified (e.g., by developers associated with the client) in order to use application programming interfaces (APIs) associated with the destination data store 270B. In one embodiment, as part of the migration, an application 292 may be modified to provide data requests 294 (e.g., reads, writes, and deletes) to the router instances 250 as an endpoint rather than to the source data store 270A or destination data store 270B, and/or to submit lock requests to the router instances. The routers 250 may supply responses 296 to those requests back to the appropriate application 292. When the migration is complete, the application may be modified again to provide requests to the destination data store 270B as an endpoint. If the migration is rolled back, the application may be modified instead to provide requests to the source data store 270A.

The live migration system 200 may ensure data accuracy in a migration. For example, the live migration system 200 may use locked writes, managed by lock manager 212 in accordance with specified locking policy of the kind discussed in the context of FIG. 1, to prevent concurrent write requests from placing a given record in an erroneous state. In some embodiments, the live migration system 200 may prioritize availability over latency. In some embodiments, the live migration system 200 may ensure the continued availability of a data set by minimally increasing latency for reads, writes, and/or deletes at some stages of a migration. The live migration system 200 may keep both the source 270A and destination data stores 270B up-to-date in order to perform efficient rollbacks without a reverse migration, if necessary. For example, a client may initiate a rollback at a late stage of the migration upon observing that the performance characteristics of the destination data store 270B are insufficient to meet expectations.

The live migration system 200 may include a live migration manager 210 that controls aspects of a migration from the source 270A to the destination 270B. In one embodiment, the live migration manager 210 may include a backfill manager that performs a backfill or transfer 222 of existing records from the source 270A to the destination 270B. The backfill manager may include components for extracting existing records 272A from the source 270A, transforming the extracted data into a format or schema required by the destination 270B, and loading the transformed records 272B into the destination 270B. Transformations may be performed according to predefined data type mappings and/or client-specified mappings. In one embodiment, the live migration manager 210 may perform an additional backfill near the end of the migration to ensure that updates to the source data store 270A since the initial backfill have been properly replicated to the destination data store 270B. The updates in the second backfill may result from live requests to write records and/or delete records during the migration. A final backfill may also ensure that updates are properly reflected in the destination data store 270B even if the updates were unsuccessfully propagated using an asynchronous update handler. In one embodiment, a data reconciler component may be continuously running from the start of the migration to ensure that records in the destination data store 270B have versions (e.g., write sequence indicators similar to WSIs discussed earlier) greater than or equal to the corresponding records in the source data store 270A. The data reconciler component may ensure that no records have been excluded from the migration.

At some point during a migration, the authoritative data store for a given data set may be switched from the source 270A to the destination 270B in a process referred to as an authority flip, orchestrated for example by the live migration manager 210. In at least one embodiment, the lock manager 212 may perform a set of cleanup actions with respect to the source data store 270A if required when such an authority flip occurs, as discussed below in further detail. The authority flip may be implemented on a router-by-router basis across the router fleet 250, e.g., by the live migration manager 210 in some embodiments. Because it may not be feasible to perform the authority flip across all the routers in an atomic manner without taking an outage, the routers may be gradually flipped on an individual basis to ensure that an outage need not be taken for the data set being migrated. The gradual authority flip may be implemented over a window of time. During this window of time, both the source and destination data stores may be consulted by a router instance for some types of requests. For example, to process a read request for a particular record, a router may read the record from both data stores and return the authoritative version of the record. To implement this functionality, each of the router instances 250 may include a read manager 252 for parallel record reading and a component for authoritative record determination. Similarly, writes may be performed in the authoritative data store and may use locks obtained from lock manager 212 to ensure write consistency. To implement this functionality, each of the router instances 250 may include a component for record writing 256, which may submit write lock requests and/or lock release requests to lock manager 212 as needed. Deletes may be implemented as "soft" deletes such that records are retained but marked for deletion (until the migration is completed). Records may be soft-deleted in this manner to enable efficient rollbacks of the migration, e.g., without requiring an expensive backfill from the destination data store back to the source data store. Read requests may filter such soft-deleted records and return "record not found" responses as if the records had actually been deleted, even if the soft deletion has not been propagated to the non-authoritative (secondary) data store. To implement this functionality, in some embodiments each of the router instances 250 may include a component for soft-deleted record filtering.

In one embodiment, respective numerical write sequence indicator (WSIs) or version numbers may be inserted into lock requests, read requests and/or write requests by the routers 250 (if not already inserted by clients 290). The WSI may be time-based, such that higher WSI numbers indicate more recent modification times. Depending on the capabilities of the data store, the WSI may be inserted using a header to a record or using an attribute in the payload. As mentioned earlier, WSIs may be used by lock manager 212 when making certain kinds of decisions such as whether one or more locks can be released without a corresponding release request. In some embodiments, the data stores 270A-270B may use persistent storage resources such as hard disk drives, solid-state drives, and so on. The data stores 270A-270B may each offer storage in a manner independent of others of the data stores. The data stores 270A-270B may use different underlying storage technologies, architectures, and/or resource types to store data. In one embodiment, aspects of the live migration system 200 may be implemented using computing resources of a provider network.

Example Deficiencies Overcome Using Enhanced Locking Techniques

Figure 3:
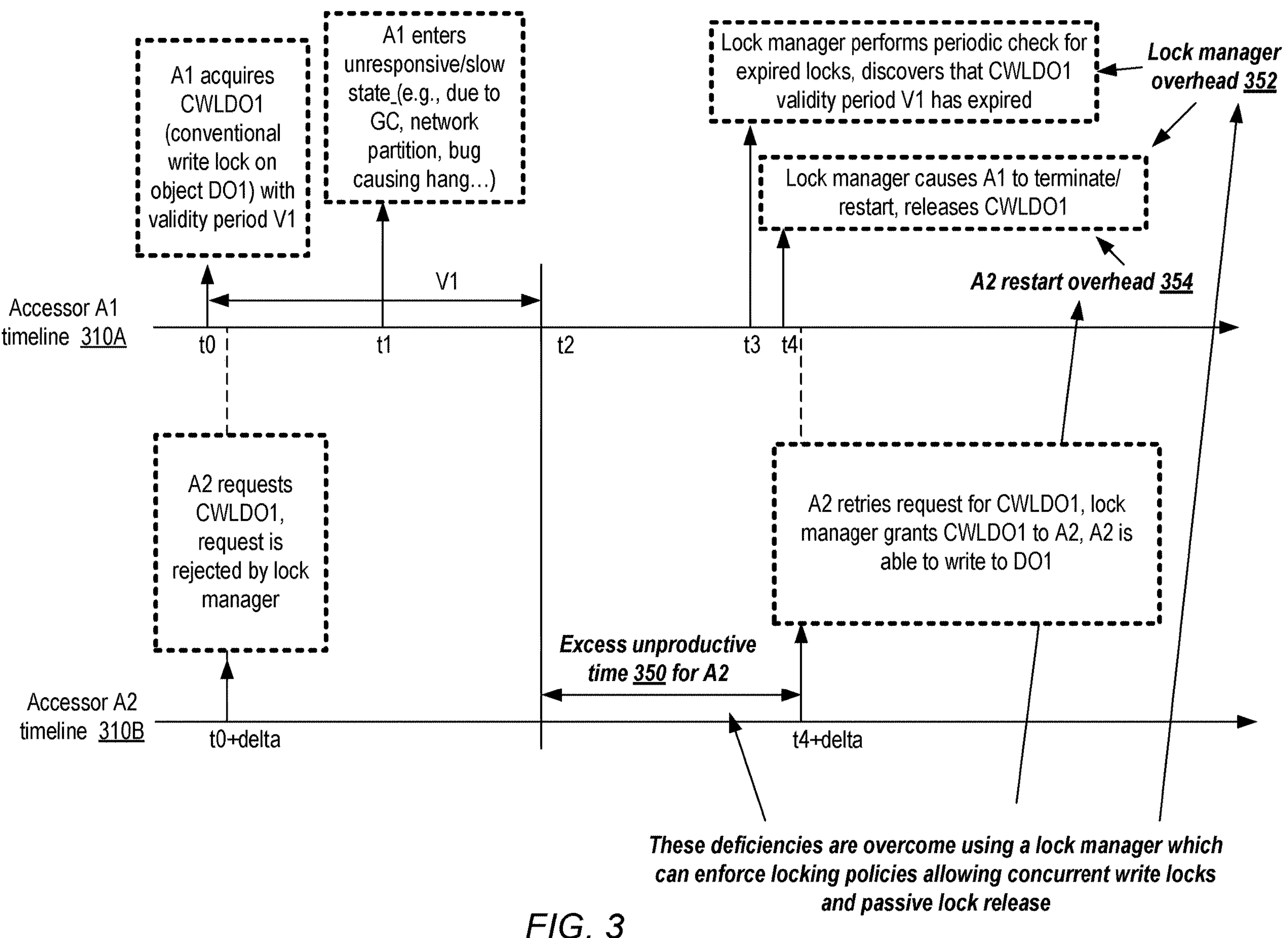
FIG. 3 illustrates example deficiencies of some conventional locking techniques employed in distributed computing environments, which may be overcome using enhanced write concurrency techniques in at least some embodiments.

FIG. 3 illustrates example deficiencies of some conventional locking techniques employed in distributed computing environments, which may be overcome using enhanced techniques in at least some embodiments. Conventional locking-related operations of two data accessors A1 and A2 are shown along timelines 310A and 310B respectively. In the depicted scenario, respective validity periods are associated with granted write locks. At time t0 along timeline 310A, accessor A1 acquires a conventional write lock on a data object DO1 (CWLDO1) with a validity period V1. Shortly after t0, at time t0+delta, as shown on timeline 310B, data accessor A2 requests a write lock on DO1, and the request is rejected by the conventional lock manager being used.

A1 enters an unresponsive or slow state at a time t1, e.g., due to a garbage collection operation, a network partitioning event, a bug causing a hang, or some other reason. At time t2, validity period V1 expires, but A1 has not yet requested that CWLD01 be released. The conventional lock manager is configured to periodically check to see whether a given granted write lock has expired; it performs such a check at time t3, and discovers that CWLDO1 has indeed expired. At time t4, the conventional lock manager then causes A1 to be terminated and restarted and releases CWLDO1.

Accessor A2 may try one or more times to re-acquire CWLDO1, e.g., in case CWLDO1 has been released by its owner or if the lock manager has actively released CWLDO1 after detecting that its validity period has expired. At time t4+delta, A2 may submit one of its retries to acquire CWLDO1, and may be granted the lock in the depicted scenario. A2 may then proceed with its write operation directed to DO1.

In the conventional methodology illustrated in FIG. 3, A2 could in principle have acquired the desired lock as soon as its validity period expired (at t2); thus, A2 has to spend excess unproductive time 350 before it can make progress. A1 may have been restarted unnecessarily, in that it may have recovered from the problem which causes its slowdown/unresponsiveness; thus, A2 bears the penalty of restart overhead 354. Furthermore, the conventional lock manager is required to check for expired locks, and expend resource restarting accessors whose locks have expired; both of these types of operations represent examples of lock manager overhead 352. In embodiments in which lock managers of the kind discussed in the context of FIG. 1 are used and can enforce locking policies which allow concurrent write locks, each of these types of deficiencies may be mitigated or overcome. Accessors such as A1 which have not released expired locks may not have to be restarted; instead, their role may simply be changed from primary lock owners to non-primary lock owners. Accessors such as A2 may be able to obtain co-ownership of a lock very shortly after the current validity period expires, thus reducing unproductive time. Finally, lock managers may not have to expend resources on repeatedly checking lock for lock expirations, or causing accesses to be restarted.

Example Elements of Locking Policies, Requests and Metadata

Figure 4:
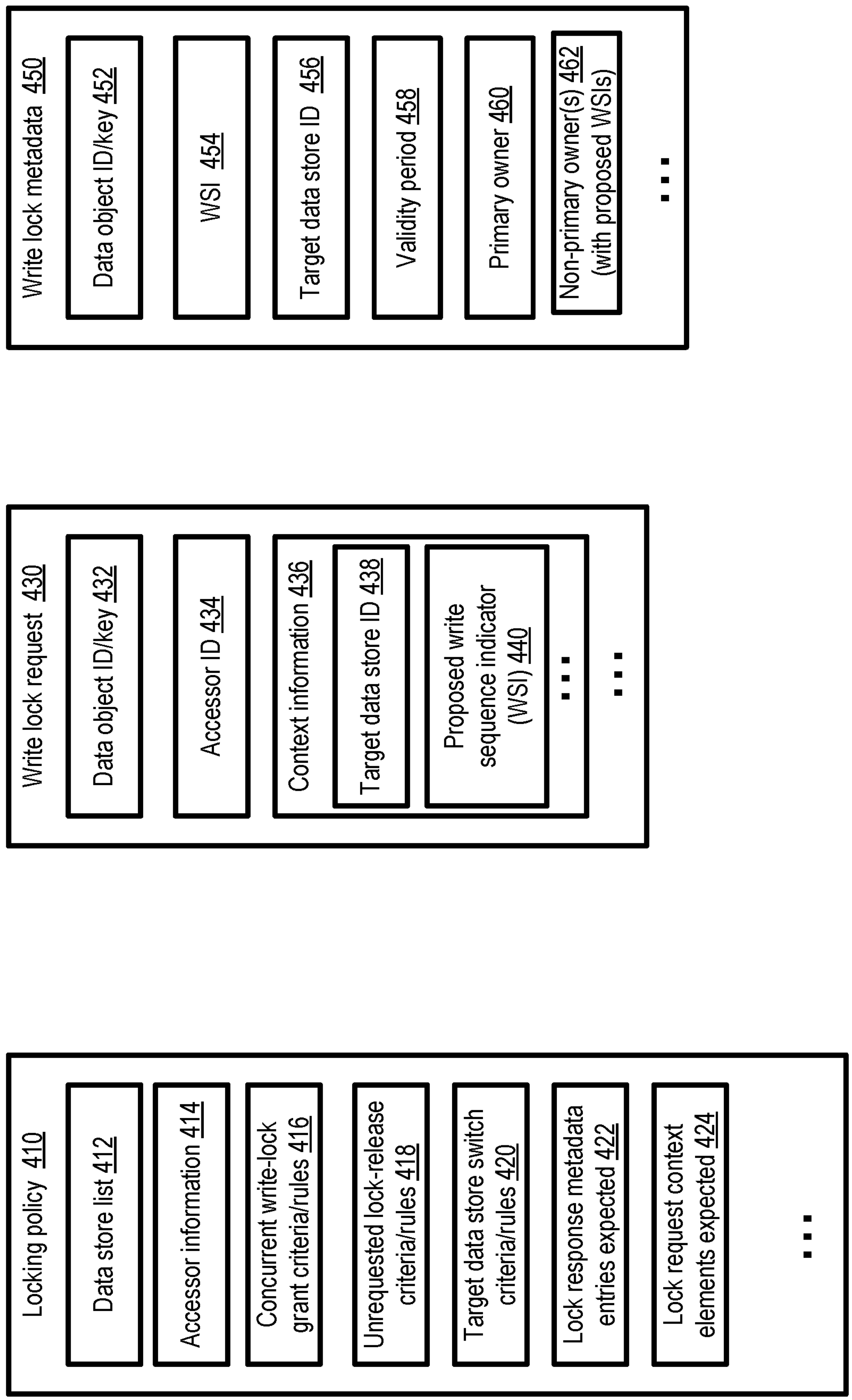
FIG. 4 illustrates example elements of locking policies, write lock requests and write lock metadata which may be used to implement enhanced locking techniques, according to at least some embodiments.

FIG. 4 illustrates example elements of locking policies, write lock requests and write lock metadata which may be used to implement enhanced locking techniques, according to at least some embodiments. A locking policy 410, which may be submitted via a programmatic interface by a client of a lock manager, may include some combination of the following elements in the depicted embodiment: a data store list 412, accessor information 414, concurrent write-lock grant criteria/rules 416, unrequested lock-release criteria/rules 418, target data store switch criteria/rules 420, lock response metadata entries 422 expected to be provided in responses to lock requests and/or lock request context elements expected to be provided to the lock manager.

The data store list 412 may identify a set of one or more data stores containing data objects of a distributed computing environment which are to be locked for writes. In some embodiments, a locking policy may also specify the set of data objects within the data stores to which the rules of the policy are to be applied; e.g., a different policy may be applied to one set of tables of a database than is applied to a different set of tables. Accessor information 414 may indicate a set of client applications, accessor intermediaries and/or network addresses from which requests for acquiring or releasing write locks are to be accepted at the lock manager for the data store list. Criteria/rules 416 may indicate the conditions under which concurrent write locks (e.g., with one lock owner designated as primary, and other lock owners designated as non-primary) are to be granted, if any such conditions are applicable. For example, in some embodiments, a concurrent write lock may be granted if the validity period of the lock with respect to its current primary owner has expired as mentioned earlier. In one embodiment, a rule 416 may indicate that a concurrent write lock is to be granted based at least partly on the source from which the lock request is received—e.g., that a concurrent write lock should be granted if a request is received from the same host or same IP (Internet Protocol) address as the host or IP address of the current primary owner, or from a set of hosts or IP addresses designated for concurrent lock ownership. In another embodiment, write sequence indicators (WSIs) indicated in lock requests may be used to determine whether a concurrent write lock is to be granted or not in accordance with a rule 416. For example, a lock may be granted concurrently to a second accessor if the WSI indicated by the primary owner differs from the WSI indicated by the second accessor, under the assumption that the data store will use the difference in the WSIs (also included in the write requests sent to the data store after the write lock is granted) to decide whether write operations are to be accepted or rejected. Criteria/rules that 416 that take analysis of a combination of factors into account, such as validity period expirations, lock request source identification information, and/or WSIs, may be specified and used in some embodiments. As such, analysis of validity periods (or any other single factor) may not be required for decisions regarding the granting of concurrent locks in such embodiments.

The functional differences between the roles of primary and non-primary lock owners may also be defined in the locking policy in some embodiments—e.g., the lock manager may only check for potential non-requested lock releases when a lock release request is received from the primary owner, and may not check for such releases when a lock release request is received from a non-primary owner in some embodiments.

Criteria/rules 418 may indicate the conditions (if any) under which locks are to be released by the lock manager without receiving specific requests for releasing them. For example, in some cases, the non-primary owners' locks may be released if lock manager is informed that a write with a higher-value write sequence indicator (relative to the write sequence indicators indicated in the non-primary owners' lock metadata entries) has been committed for the data object. Target data store switch criteria/rules 420 may indicate the circumstances (if any) in which the lock manager may grant a lock for a different data store than the one to which the lock request was targeted. For example, one such rule may indicate that if a write lock request targeting a data object DO at a data store DS1 is received, and a write lock is currently granted for DO at a different data store DS2, the lock manager may offer the requester the opportunity to lock DO in DS2 rather than DS1. The set of metadata entries which are to be stored for write locks and are expected to be provided to lock requesters may be indicated in element 422 in some embodiments; such entries may for example be used by a lock requester to determine whether it makes sense to re-submit a lock request. The elements of context information (e.g., the target data store, the proposed write sequence indicator, etc.) that lock requesters are expected to provide in write lock requests may be included in element 424 of a locking policy in some embodiment; if a given lock request does not include required elements, it may be rejected by the lock manager in some embodiments.

A write lock request 430 submitted by or on behalf of a data accessor may for example include an identifier or key 432 of a data object, an identifier of the accessor 434 (e.g., a host name at which an accessor process runs, a process identifier of the accessor process, and a start time of the accessor process), and one or more elements of context information 436 in the depicted embodiment. The context information may include an identifier 438 of a target data store with respect to which the data object is to be locked for writing, and/or a write sequence indicator (WSI) 440 in the depicted embodiment. In at least some embodiments, writes may be applied at a given data store in the order indicated by the WSIs of the corresponding write locks, and the data store may maintain an indicator of the WSI of the most recent write applied for a given data object. For example, a write with a WSI value 10 may only be accepted and applied to a data object if the current (most recently committed) WSI for the data object is no greater than 9. WSIs may be generated in some embodiments based on a read-modify-write model—e.g., an accessor may read the current WSI of a targeted data object, determine a higher WSI for the targeted data object (e.g., from a WSI generator or a clock), obtain a write lock using the higher WSI, and then submit a write request with the higher WSI to the target data store.

Write lock metadata 450 stored for a given data object by a lock manager may include a data object ID/key 452, a WSI 454 corresponding to the current primary owner's lock, an identifier 456 of a target data store for which the lock is granted, a validity period 458 (expressed, for example, as an "epoch" value in milliseconds since a particular starting time), and indications of the primary owner 460 and zero or more non-primary owners 462 in the depicted embodiment. In at least some embodiments, the proposed WSIs which had been indicated in the lock requests of the non-primary owners and/or their respective validity period information may also be stored in the write lock metadata. A locking policy 410, write lock request 430, and write lock metadata 450 may each be stored in or transmitted via respective data structures in some embodiments. In at least one embodiment, some of the elements shown in FIG. 4 for locking policy 410, write lock request 430 and/or write lock metadata 450 may not be required, and/or other elements may be included in the respective data structures.

Example Sequence of Locking Interactions

Figure 5A:
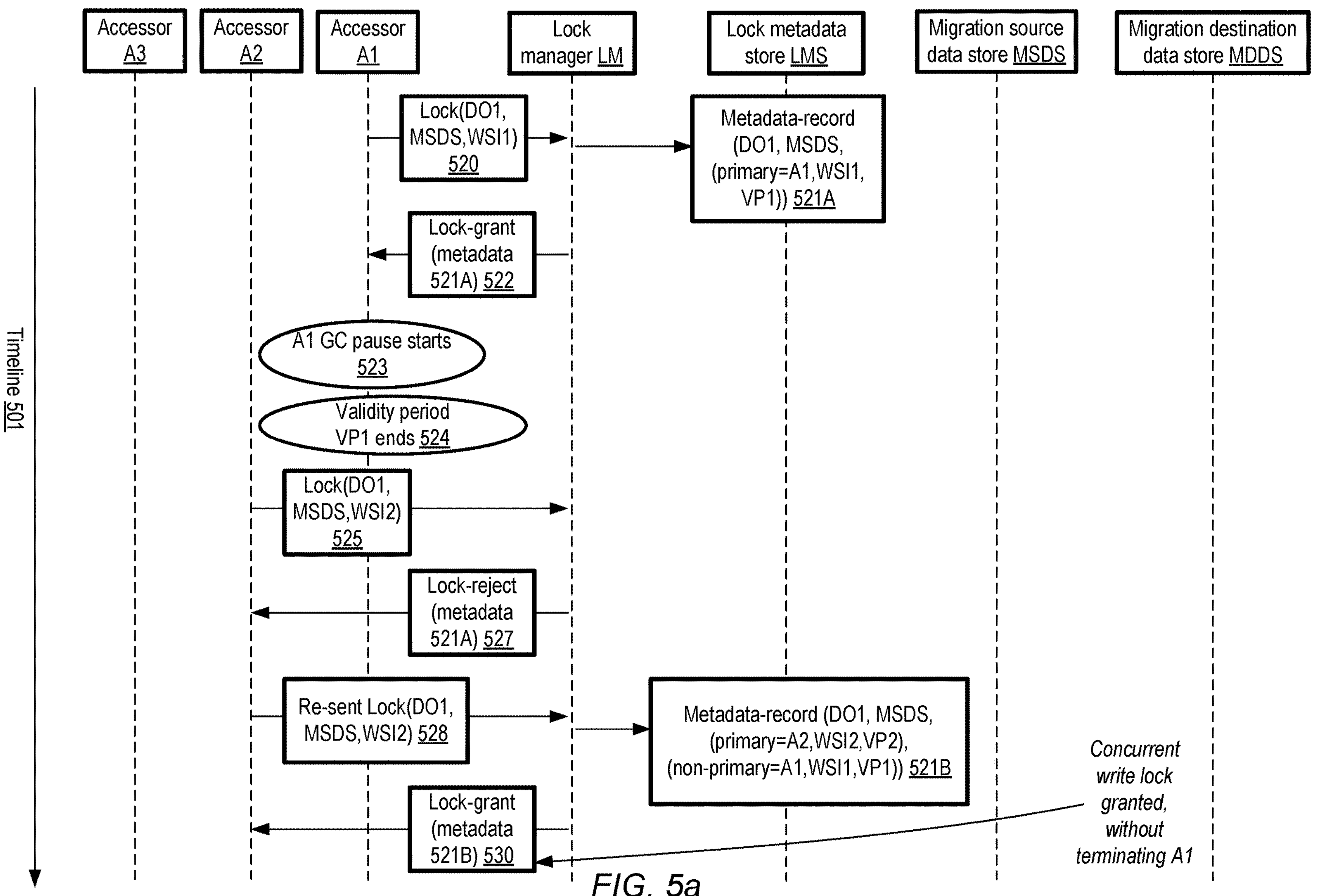
FIG. 5*a*, FIG. 5*b* and FIG. 5*c* collectively illustrate an example sequence of interactions with a lock manager supporting concurrent write locks, according to at least some embodiments.
Figure 5B:
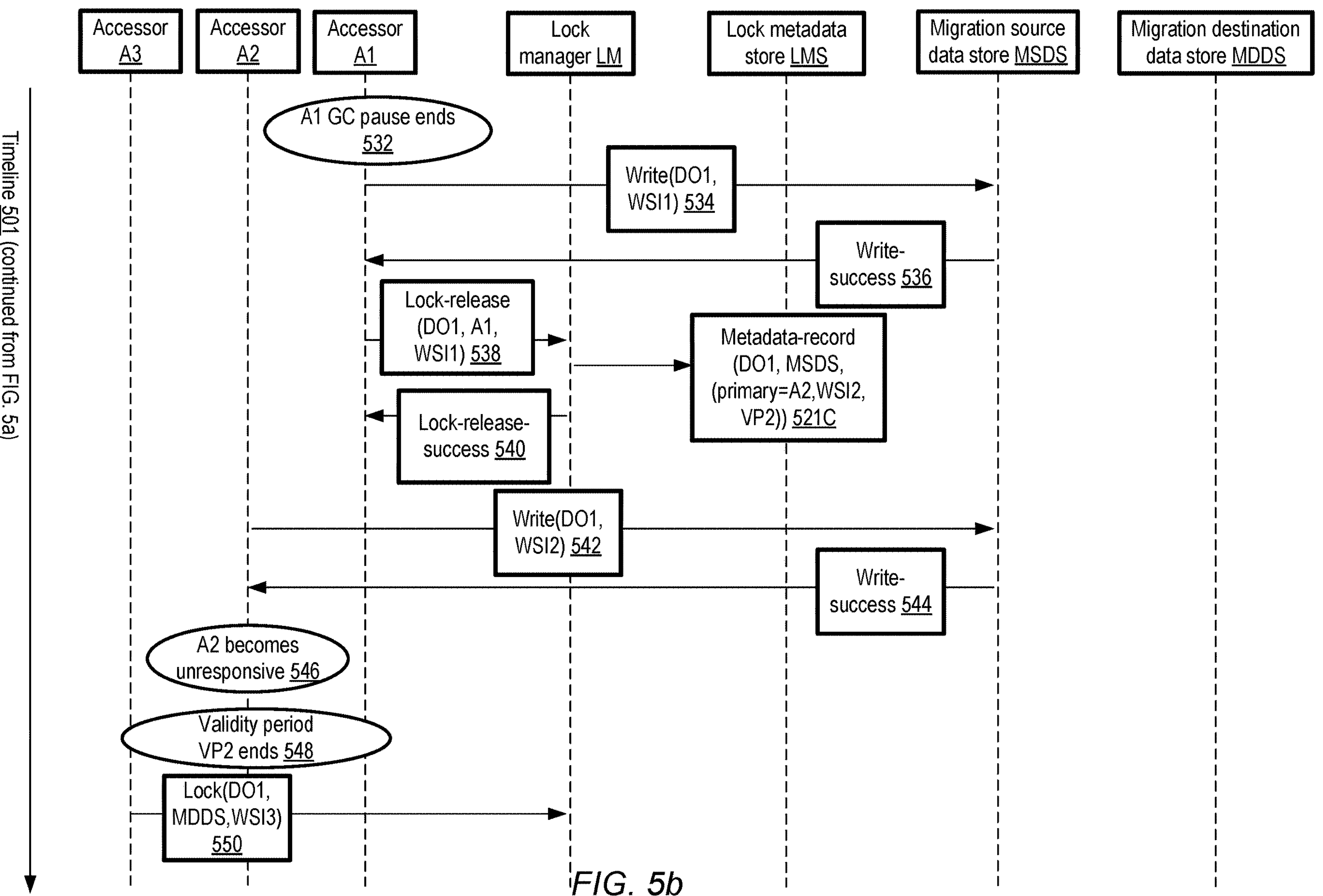
Figure 5C:
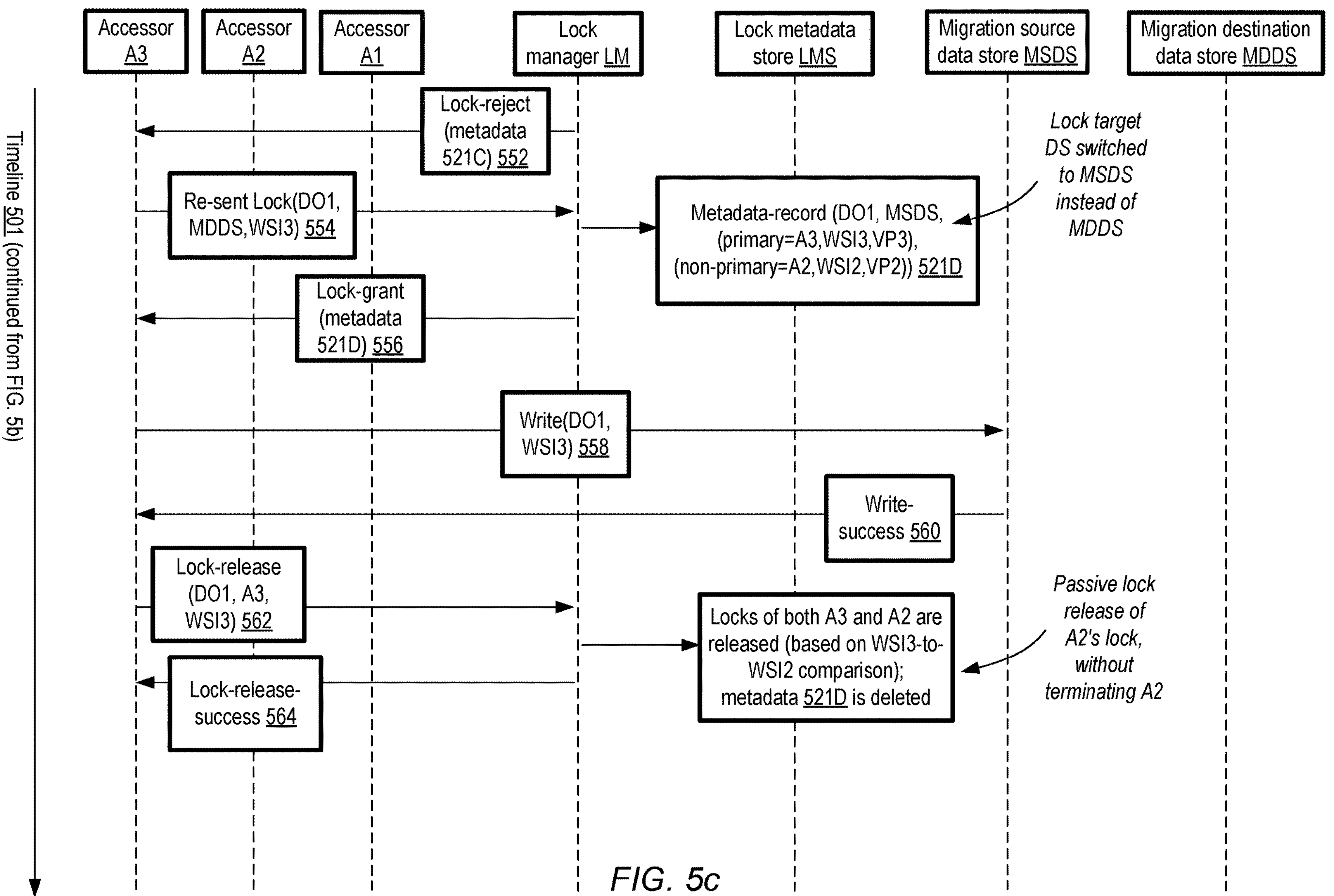

FIG. 5*a*, FIG. 5*b* and FIG. 5*c* collectively illustrate an example sequence of interactions with a lock manager supporting concurrent write locks, according to at least some embodiments. In each of these three figures, events are arranged along a timeline 502, with times increasing from top to bottom of the figure. The lock manager (LM) in the depicted embodiment is being used to enforce a locking policy during a live migration of data from a source data store (MSDS) to a destination data store (MDDS). In FIG. 5*a*, a lock request 520 for a data object DO1 within the MSDS, with a proposed write sequence indicator WSI1, is submitted on behalf of an accessor A1 to a lock manager LM. DO1 is currently unlocked for writes. Accordingly, based on an applicable locking policy, the LM stores a metadata record 521A in a lock metadata store LMS indicating that the primary owner of the write lock on DO1 with respect to MSDS is A1, with the proposed WSI and a validity period expiration time of VP1, as indicated by the element (primary=A1, WSI1, VP1). The LM includes the metadata 521A in a lock-grant message 522 sent back to A1 in the depicted embodiment.

At some point after the lock is granted to A1, a garbage collection pause occurs at A1, as indicated by element 523; this pause prevents A1 from performing any lock-related or write operations for some time. The validity period VP1 ends shortly thereafter, while A1 remains paused, as indicated by element 524.

A lock request 525 for the same data object and the same target data store MSDS, but with a different WSI WSI2 is received at the LM. The LM looks up the lock metadata for the targeted data object, discovers that the data object is currently locked, and sends a lock-reject message 527 to the requester, containing the metadata 521A. Note that the LM does not check whether the validity period has expired at this stage in the depicted embodiment.

A2 (or an accessor intermediary acting on behalf of A2) detects that VP1 has expired and re-sends the lock request 528 to the LM. Upon receiving the re-sent lock request 528, the LM discovers that the validity period VP1 of the current primary lock owner A1 has expired, and modifies the lock metadata to enable co-ownership of the lock in the depicted embodiment. The modified version 521B of the lock metadata comprises an entry (primary=A2, WSI2, VP2) indicating A2 as the primary owner of the lock on DO1 in MSDS with a validity period expiration time VP2, and another entry (secondary=A1, WSI1, VP1) indicating that the previous primary owner has now been designated as a non-primary owner. A concurrent write lock is thus granted to A2 without terminating A1. Metadata version 521B, indicating this grant, is sent to A2 in message 530.

In FIG. 5*b*, in which timeline 502 continues, the garbage collection pause which was affecting A1 ends, as indicated by element 532. A1 submits its write request 534 to the MSDS, where the write is applied and a write-success response 536 is sent to A1. A1, which has not been notified regarding the concurrent lock, sends a lock release request 538 to the LM. The lock release request 538 includes the metadata which was sent to A1 at the time its lock request was granted. The lock manager modifies the metadata version 521B to indicate that the non-primary owner has relinquished the lock, resulting in metadata version 521C being stored at the lock metadata store. A lock-release-success message 540 is sent to A1 by the LM; A1 is not informed about the fact that A2 has been granted the write lock.

At some point in time after the lock release performed on behalf of A1, A2 (which has primary ownership of the write lock on DO1/MSDS) sends a write request 542 to MSDS. This write request is also accepted, and a write-success message 544 is sent to A2 from MSDS. A2 then itself becomes unresponsive (element 546), e.g., due to a bug which causes it to hang. The validity period VP2 of A2's lock also expires, as indicated in element 548, before A2 requests a lock release.

A third accessor A3 later sends a lock request 550 for DO1 to the LM, indicating the destination data store MDDS as the target. FIG. 5*c* shows the subsequent events after lock request 550 is sent. Because DO1 is locked at this point (although the lock was granted with respect to MSDS and not MDDS), the LM sends a lock reject message 552 with the current version of metadata 521C, indicating the current primary owner A2 and the expired validity period VP2.

Based on the expiration of VP2, A3 re-sends the lock request 554 to the LM, once again indicating MDDS as the target data store. The locking policy being enforced allows the LM to switch the target data store to MSDS and grant primary ownership to A3 (because VP2 has expired) if A3 is willing to accept the lock with respect to MSDS instead of MDDS. As such, the metadata record may be updated to indicate A3 as the primary owner and A2 as a non-primary owner, resulting in metadata version 521D. This version of the metadata may be provided to the new primary lock owner A3 in lock-grant message 556 by the LM in the depicted embodiment. A3 initiates its own write operation 558, directed to MSDS instead of the initial target MDDS. The write request is accepted at the MSDS based on its WSI, and a write-success message 560 is sent to A3.

A3 sends its own lock-release request 562 after its write succeeds. The LM releases A3's lock, and also checks to see whether any non-primary owners' locks can also be released based on the WSI values of the non-primary locks. In the depicted scenario, based on determining that WSI3 is greater than (and hence the write by A3 supersedes the write corresponding to) WSI2, the non-primary lock granted earlier to A2 is also released, and metadata 521D is deleted by the lock manager. Note that A2 is not terminated even though its lock is released, thus avoiding overhead associated with such a termination and the associated restart; A2 may, for example, become responsive again on its own after a temporary problem is resolved, so no restart would be needed. Even if a termination and restart of A2 is eventually required, the associated work is not performed by the lock manager. A lock-release-success message 564 is sent to A3. As illustrated in FIG. 5*a*-5*c*, in at least some embodiments a lock manager may enforce a locking policy which avoids restarting accessors whose locks have expired while maintaining data consistency, and switches target data stores if needed to enable accessors such as A3 to proceed when the data object for which a lock is requested is already locked in a different data store. Furthermore, such a lock manager may avoid incurring overhead associated with tracking expired locks, as well as overhead associated with causing data accessors to be terminated/restarted.

Methods for Enhanced Locking

Figure 6:
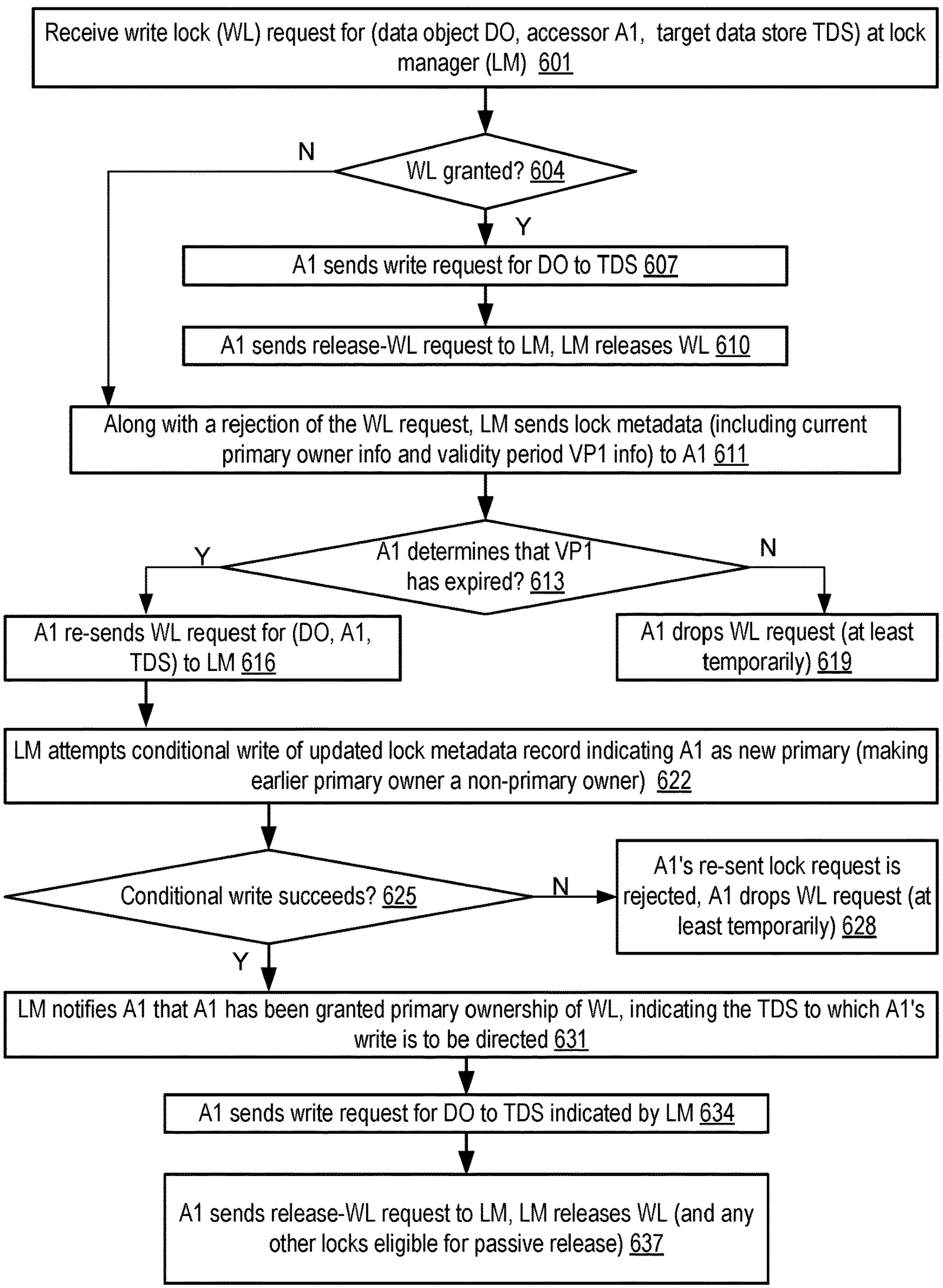
FIG. 6 is a flow diagram illustrating aspects of operations that may be performed to support enhanced-concurrency write locking, according to at least some embodiments.

FIG. 6 is a flow diagram illustrating aspects of operations that may be performed to support enhanced-concurrency write locking, according to at least some embodiments. In the depicted embodiment, a locking policy in which co-ownership of write locks is supported if the primary ownership of a lock has expired may be employed by a lock manager similar in functionality to lock manager 130 of FIG. 1, and expired locks may also be released passively based on write sequence information. As shown in element 601, a write lock request (WL) for a data object DO in a target data store TDS may be received from or on behalf of a data accessor A1, e.g., via programmatic interfaces of the lock manager (LM). If WL is granted to A1, e.g., by designating A1 as the primary owner (as detected in element 604), A1 sends a write request for DO to TDS (element 607). After the processing of the write request is completed, A1 sends a request to release WL to the LM, and the LM releases WL by removing metadata indicating that A1 is the primary owner of WL (element 610). Note that the processing of the write request at TDS may not necessarily result in a successful write; A1 may request the release of the lock regardless of whether the write succeeds or fails.

If the LM determines that WL is already owned by another accessor, A1's request for WL may be rejected, as also detected in element 604. The LM may include WL's metadata to A1 in the rejection message sent to A1 (element 611). This metadata may include, for example, information about the validity period VP1 of the current primary ownership of WL. A1 may determine if VP1 has expired. If A1 determines that VP1 has not expired (in operations corresponding to element 613), A1 may drop further consideration of its request for WL, at least temporarily (element 619) in the depicted embodiment. In at least some embodiments, A1 may wait for some time and then try to obtain WL again.

If A1 determines that VP1 has indeed expired (also in operations corresponding to element 613), A1 may re-send the write lock request for DO and TDS to the LM (element 616) in the depicted embodiment. In at least some embodiments, the re-sent request may use a different API, or may indicate via a parameter that it is being sent after determining that the desired lock's primary ownership has expired.

When the LM receives the re-sent lock request, it may attempt to designate A1 as the new primary owner (and change the status of the earlier primary owner to a non-primary owner) by modifying the lock metadata in the depicted embodiment (element 622). This may be done, for example, by issuing a conditional write request for the metadata to the metadata store in some embodiments. If the conditional write request succeeds (as detected in element 625), the LM may notify A1 that A1 has been granted primary ownership of WL, indicating the target data store TDS to which A1's write of DO should be directed (element 631). As discussed earlier, depending on the locking policy being used, the LM may in some cases change the target data store. A1 may then send a write request for DO to the target data store (element 634). After the write request is processed, A1 may send a lock release request to the LM (element 637). In addition to releasing A1's lock (by deleting lock metadata indicating A1 as the primary owner), the LM may also release other co-owned locks, e.g., based on comparing the write sequence indicator of A1's write with the proposed write sequence indicators of the non-primary owners' locks in the depicted embodiment.

In some cases, the conditional write submitted by the lock manager to the metadata store in operations corresponding to element 622 may fail. This may happen, for example, if a different conditional write, designating some other data accessor as the new primary owner, was also sent to the metadata store at about the same time by the LM, and the other conditional write happened to be accepted/committed first. In such a scenario, which may occur for example if there is a lot of contention for writes to DO, A1 may be informed that its re-submitted lock request has also been rejected by the LM (element 628) in the depicted embodiment. A1 may then drop its write request at least temporarily.

Figure 7:
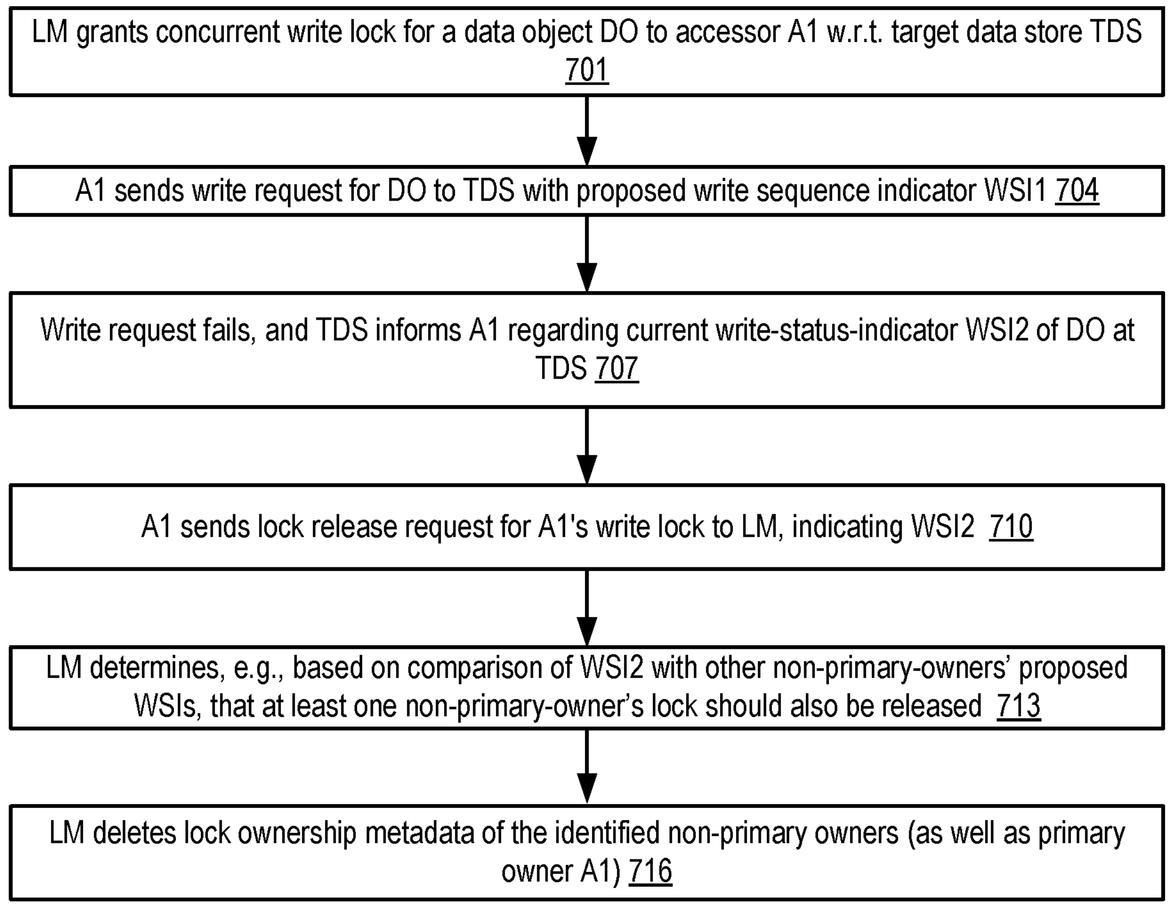
FIG. 7 is a flow diagram illustrating aspects of operations that may be performed to clean up write locks after a write attempt fails, according to at least some embodiments.

In some embodiments in which write sequence indicators are used, a lock manager may use information the indicators to release locks passively even if a lock holder's write request fails. FIG. 7 is a flow diagram illustrating aspects of operations that may be performed to clean up write locks after a write attempt fails, according to at least some embodiments. As shown in element 701, a lock manager (LM) similar in functionality to lock manager 130 of FIG. 1 may grant a concurrent write lock for a data object DO to an accessor A1 (e.g., by making A1 the primary owner and changing the status of the previous primary owner to non-primary owner) with respect to a target data store TDS. A1 may then send a write request for DO to TDS with a proposed write sequence indicator WSI1 (element 704).

The write request may fail at TDS in the depicted scenario, e.g., based on a comparison of WSI1 with the write sequence indicator of the most recently applied or committed write of DO. The TDS may inform A1 that the write request has failed, and the message indicating the failure may include an indication of the WSI (WSI2) of the most recently committed write (element 707).

After receiving the response from the TDS indicating that the write request failed, A1 may send a lock release request for A1's lock to the LM, and this request may indicate WSI2 as the current WSI of DO at TDS (element 710). The LM may use this information about the current state of DO at TDS to determine whether any other locks (besides A1's lock) can be released passively. For example, if the proposed WSIs of any of the non-primary owners are smaller than WSI2, this may mean (in accordance with the locking policy being used) that those writes would be rejected at the TDS, and therefore there is no need to retain the corresponding lock metadata. If the LM identifies any such non-primary locks which can be released based on the information received regarding WSI2 (element 713), their lock metadata may also be deleted along with that of A1 in the depicted embodiment (element 716). Note that in at least one embodiment, instead of relying on obtaining information about the current status of a data object from a data accessor (e.g., relying on A1 to provide WSI2 in a lock release request), the lock manager may itself query the data store to determine the WSI of a data object such as DO (e.g., when a lock release request for DO is obtained from its lock's primary owner), and release non-primary locks accordingly.

Figure 8:
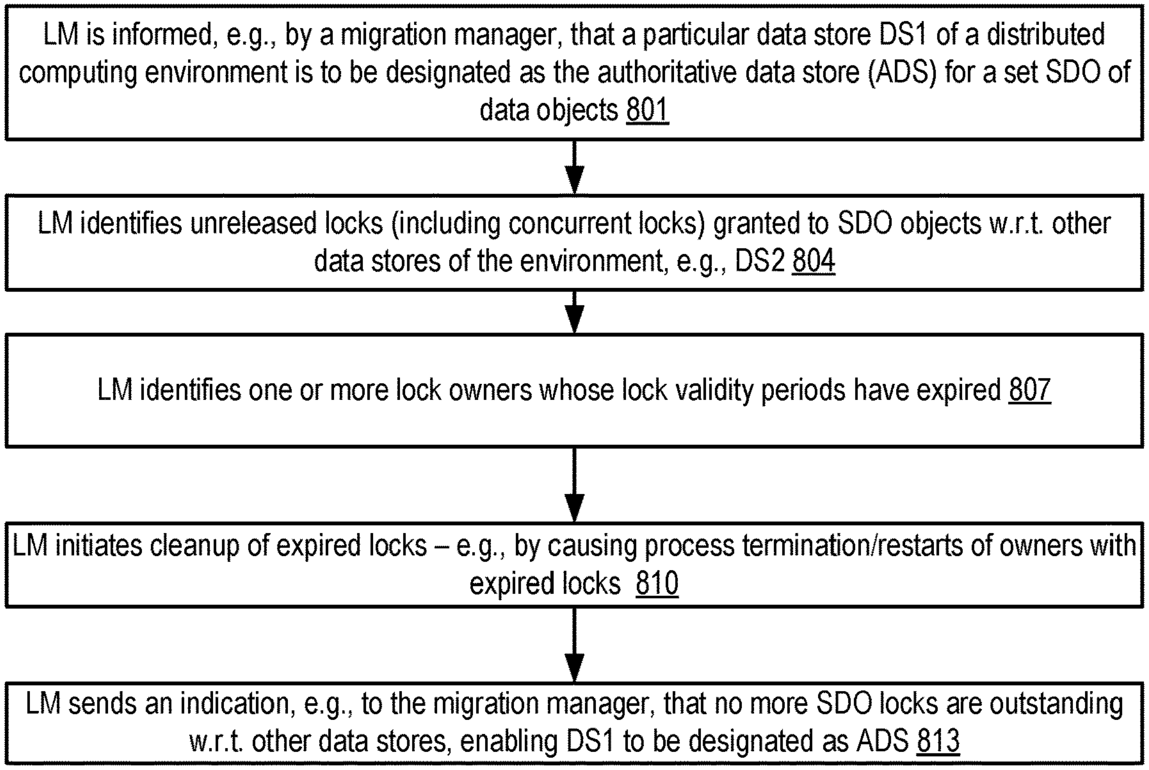
FIG. 8 is a flow diagram illustrating aspects of operations that may be performed by a lock manager to facilitate the designation of a data store as an authoritative data store for a set of data objects, according to at least some embodiments.

In at least some embodiments, a lock manager similar in functionality to lock manager 130 of FIG. 1 may perform lock cleanup tasks during a stage of a live migration of a data set from one data store to another. As indicated earlier in the context of FIG. 2, a destination data store of a migration may be designated as the authoritative data store at some stage of the migration procedure, indicating that future data accesses (at least from a given request router) should be directed only to the destination data store. FIG. 8 is a flow diagram illustrating aspects of operations that may be performed by a lock manager to facilitate the designation of a data store as an authoritative data store for a set of data objects, according to at least some embodiments.

As shown in element 801, a lock manager LM) may be informed, e.g., by a migration coordinator similar in functionality to live migration manager 210 of FIG. 2, that a particular data store DS1 of a distributed computing environment is to be designated as the authoritative data store (ADS) for a set SDO of data objects in various embodiments. DS1 may be the destination data store for a migration of SDO from a source data store DS2, for example. DS1 may be designated as the ADS, for example, based on a determination that a respective version of all (or at least a targeted fraction of) SDO objects has been stored at DS1.

In response to receiving the information, the LM may query its lock metadata store to identify any un-released locks (e.g., locks whose metadata indicates primary owners, or non-primary owners) granted for SDO objects with respect to other data stores such as DS2 of the distributed computing environment (element 804). The LM may identify one or more lock owners whose lock validity periods have expired (element 807). Accordingly, LM may initiate a cleanup of such expired locks (element 810), e.g., by causing process termination/restarts of the lock owners with expired locks and then deleting the corresponding lock metadata. The LM may no longer grant locks with respect to the non-authoritative data stores in the depicted embodiment. After the owners have been terminated/restarted, the LM may send an indication, e.g., to the migration manager, that no more locks on SDO objects remain outstanding, enabling DS1 to be designated as the ADS (element 813). In some embodiments, the LM may obtain WSI information with respect to various still-locked data objects from the data store(s), and use the WSIs to determine whether any lock owners should be terminated/restarted as part of the lock cleanup. For example, if the proposed WSI of a currently-granted lock WL1, granted to an accessor A1 for a data object DO1 is WSI-A, and a write of DO1 with a higher WSI (WSI-B, greater than WSI-A) has already been committed/stored at the target data store, the LM may determine that there is no need to restart the current owner A1 as part of the lock cleanup. The LM may make this determination under the assumption that the data store will ensure, after comparing WSI-A with WSI-B, that A1's write operation directed at DO1 is rejected (if a request for such a write operation ever reaches the data store). Instead, the lock metadata indicating A1 as the owner may simply be discarded in the cleanup in such a scenario, without terminating/restarting A1.

It is noted that in various embodiments, some of the operations shown in FIG. 6, FIG. 7, or FIG. 8 may be implemented in a different order than that shown in the figure, or may be performed in parallel rather than sequentially. Additionally, some of the operations shown in FIG. 6, FIG. 7 or FIG. 8 may not be required in one or more implementations.

Example Provider Network Environment

Figure 9:
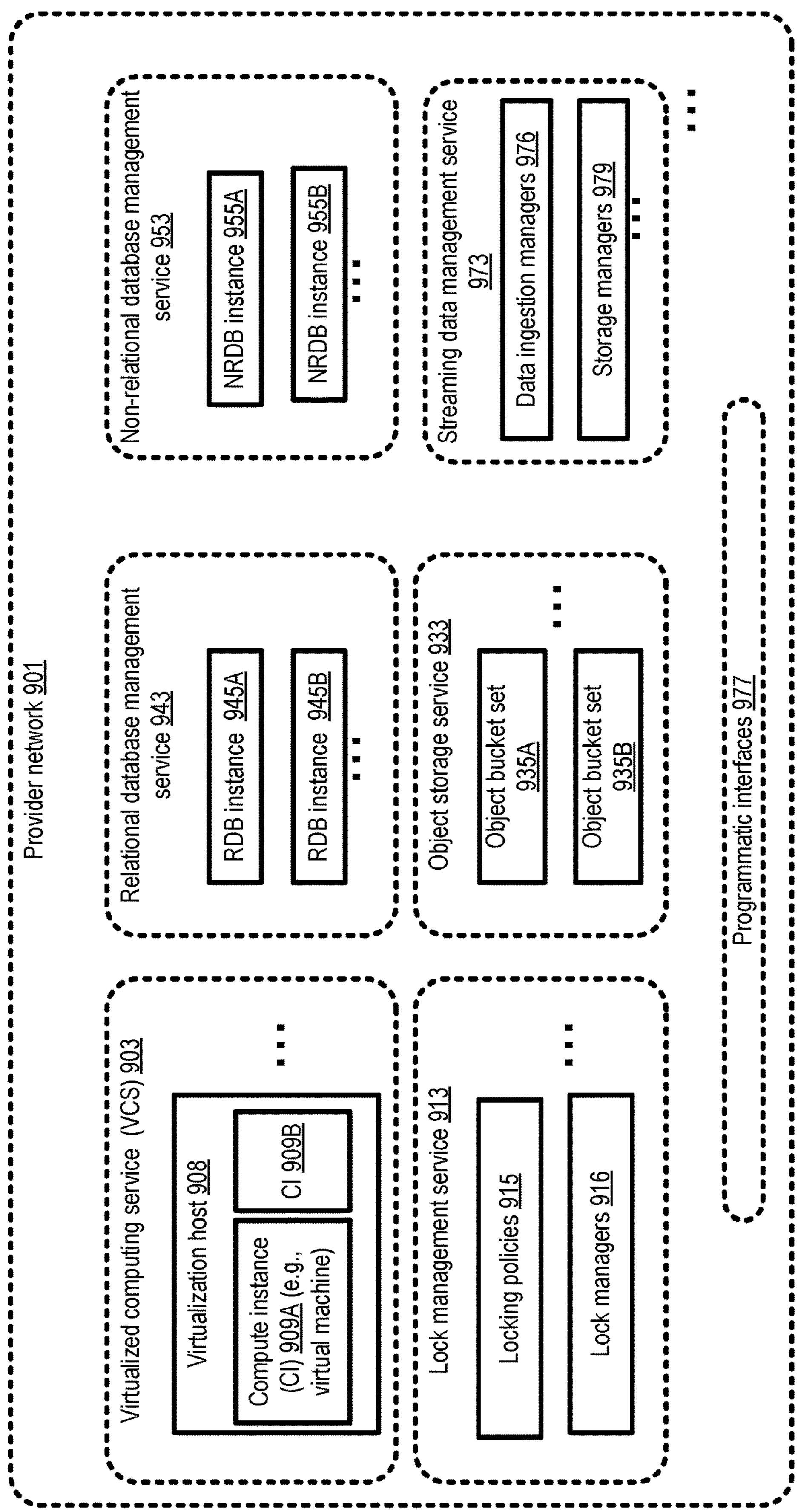
FIG. 9 illustrates an example provider network environment at which a locking service may be implemented, according to at least some embodiments.

In some embodiments, as mentioned earlier, the locking techniques described above may be implemented at a locking service of a provider network. FIG. 9 illustrates an example provider network environment at which a locking service may be implemented, according to at least some embodiments. In the depicted embodiment, provider network 901 may comprise resources used to implement a plurality of publicly-accessible services accessible over the Internet and other types of networks, including for example a virtualized computing service (VCS) 903, a relational database management service 943, a non-relational database management service 953, an object storage service 933, a streaming data management service 973 as well as a locking management service 913. The lock management service 913 may include one or more lock managers 916, similar in features and functionality to lock manager 130 of FIG. 1, configured to implement a collection of locking policies 915 in the depicted embodiment. At least some of the functionality of the lock management service 913 may be implemented using resources of other services: for example, lock manager logic may run at compute instances (CIs) such as 909A or 909B at virtualization hosts such as 908 of the VCS 903, lock metadata may be stored at relational database management service 943 or non-relational database management service 953, and so on.

In some embodiments in which the kinds of enhanced write locks discussed above are implemented for data objects which are being migrated, the source and/or destination data store of a migration may comprise a relational database (RDB) instance 945 (such as RDB instances 945A or 945B) or a non-relational database (NRDB) instance (such as NRDB instances 955A or 955B). Note that the lock management techniques introduced herein may not necessarily be applied to database objects, and may not necessarily be used only during migrations, in at least some embodiments. For example, data objects stored in object bucket sets 935A or 935B of object storage service 933 may be locked using the described techniques in one embodiment. The streaming data management service 973 may move stream records received by ingestion managers 976 among various stream partitions orchestrated by storage managers 979, and the lock managers 916 may also be used for stream records in some embodiments. A distributed computing environment for which the locking techniques discussed earlier are employed may include data stores at several different services in some embodiments—e.g., the locking techniques may be used during migrations of data from an RDB instance 945 to an NRDB instance 955 in some cases.

Generally speaking, components of a given service of provider network 901 may utilize components of other services in the depicted embodiment. Individual ones of the services shown in FIG. 9 may implement a respective set of programmatic interfaces 977 which can be used by external and/or internal clients (where the internal clients may comprise components of other services) in the depicted embodiment. Note that at least in some embodiments, lock managers may implement locking policies of the kind described earlier without using provider network resources—e.g., a set of standalone computing devices which are not part of a provider network service may be used.

Use Cases

The locking techniques described above may be extremely useful in a variety of scenarios. Many applications utilize large data sets which are originally located at one data store, but may eventually have to be moved to other data stores. The data sets may be so large that pausing the applications to facilitate the data transfer may be impractical, as this would make the applications inaccessible for too long. Instead, live migrations of the data may be performed, in which respective fractions of the data may exist in both the source and the destination data stores at a given point of time while the application continues to service requests submitted by end customers. Similar transitions of data may be implemented by storage lifecycle management services, streaming data management services and so on. Many of the accessors modifying the data may be susceptible to periods of slow performance and/or unresponsiveness, e.g., if they are implemented using run-time environments in which garbage collection is used for memory management, or due to events such as temporary network problems. The ability to grant concurrent write locks of the kind described, without terminating data accessors currently holding locks, may enable various accessors to continue to make progress, while reducing locking-related overhead. Lock managers' overhead may also be reduced if they do not have to keep checking for expired locks, thus enabling more locking-related requests to be processed by the lock managers.

Illustrative Computer System

Figure 10:
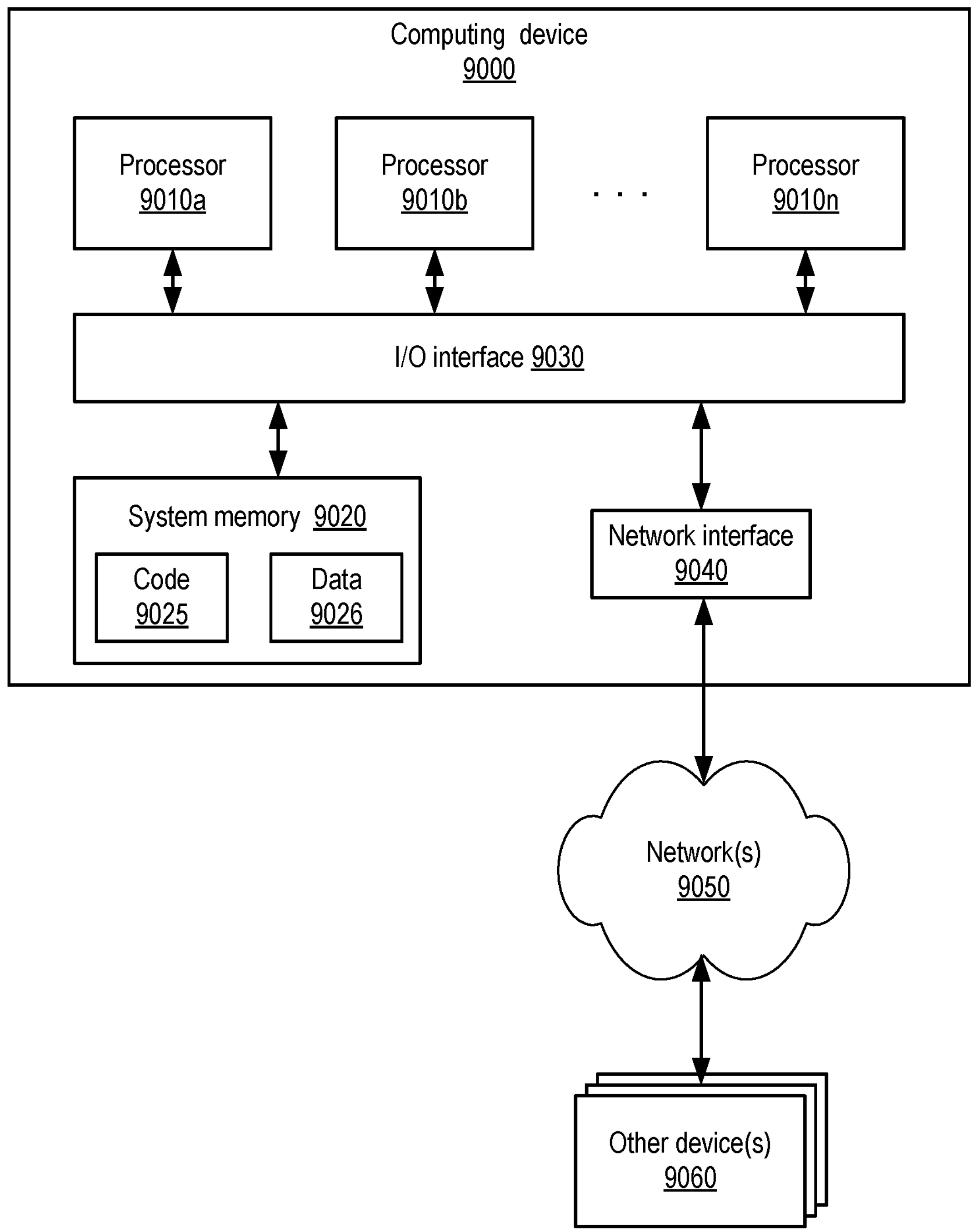
FIG. 10 is a block diagram illustrating an example computing device that may be used in at least some embodiments.

In at least some embodiments, a server that implements the types of techniques described herein (e.g., various functions of a lock manager, data accessors, accessor intermediaries, and/or components of a migration system), may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

one or more computing devices;

wherein the one or more computing devices include instructions that upon execution on or across the one or more computing devices implement a lock manager configured to:

obtain an indication, via one or more programmatic interfaces, of a locking policy for a plurality of data stores of a distributed computing environment, wherein the plurality of data stores includes a first data store, wherein respective versions of a data object are stored at one or more data stores of the plurality of data stores, and wherein the locking policy indicates at least a validity period-based criterion for granting co-ownership of write locks;

receive a first write lock request directed to a first data object on behalf of a first accessor, wherein the first write lock request indicates the first data store as a target data store;

in response to a determination that the first data object is unlocked, store lock metadata associated with the first data object in accordance with the locking policy, indicating at least (a) the first accessor as a primary owner of a write lock on the first data object with respect to the first data store and (b) a first validity period of a primary ownership of the write lock;

in response to a second write lock request directed to the first data object on behalf of a second accessor before the write lock has been released, transmit at least a portion of the lock metadata, without determining whether the first validity period of the primary ownership has expired;

determine that the second write lock request has been re-sent on behalf of the second accessor, wherein the second write lock request is re-sent based at least in part on a detection of an expiration of the first validity period indicated in the portion of the lock metadata;

based at least in part on the locking policy, modify the lock metadata associated with the first data object in response to re-sending of the second write lock request to indicate at least (a) the second accessor as the primary owner of the write lock on the first data object (b) the first accessor as a non-primary owner of the write lock on the first data object and (c) a new validity period of the primary ownership of the write lock on the first data object; and transmit an indication that the second accessor is permitted to submit a write request directed to the first data object at the first data store.

2. The system as recited in claim 1, wherein the first write lock request includes a first write sequence indicator, wherein the second write lock request includes a second write sequence indicator, wherein the first and second write sequence indicators are utilized at the first data store to determine whether a particular write request is to be accepted, and wherein the lock manager is further configured to:

store the first and second write sequence indicators in the lock metadata associated with the first data object; and determine, based at least in part on a comparison of the first and second write sequence indicators, whether to terminate a non-primary ownership of the write lock without receiving a request to release the write lock on behalf of the first accessor.

3. The system as recited in claim 1, wherein the locking policy includes an unrequested release rule, and wherein the lock manager is further configured to:

determine, based at least in part on the unrequested release rule, whether to terminate a primary or non-primary ownership of the write lock without receiving a request to terminate the ownership.

4. The system as recited in claim 1, wherein the plurality of data stores includes a second data store, wherein the locking policy includes a target switch rule, and wherein the lock manager is further configured to:

receive another write lock request directed to the first data object on behalf of a third accessor, wherein the other lock request indicates the second data store as a target data store; and in response to detecting that the write lock associated with the first data object remains granted to at least one accessor with respect to the first data store, grant primary ownership of the write lock to the third accessor with respect to the first data store, without granting access to a write lock associated with the second data store.

5. The system as recited in claim 1, wherein the plurality of data stores includes a second data store, wherein the first data store is a source data store of a migration of a plurality of data objects including the first data object, and wherein the second data store is a destination data store of the migration.

6. A computer-implemented method, comprising:

receiving, at a lock manager, a first write lock request directed to a first data object on behalf of a first accessor, wherein the first write lock request indicates a first data store of one or more data stores of a distributed system as a target data store;

in response to a determination that the first data object is unlocked, the lock manager storing lock metadata associated with the first data object indicating that the first accessor is a primary owner of a write lock on the first data object with respect to the first data store;

in response to a second write lock request directed to the first data object on behalf of a second accessor before the write lock has been released, the lock manager transmitting at least a portion of the lock metadata;

in response to determining that the second write lock request has been re-sent on behalf of the second accessor and based on a determination that a locking policy of the write lock has been satisfied, the lock manager modifying the lock metadata associated with the first data object to indicate at least (a) the second accessor as the primary owner of the write lock on the first data object with respect to the first data store and (b) the first accessor as a non-primary owner of the write lock on the first data object; and the lock manager transmitting an indication that the second accessor is permitted to submit a write request directed to the first data object at the first data store.

7. The computer-implemented method as recited in claim 6, further comprising:

obtaining, by the lock manager via one or more programmatic interfaces, one or more concurrent lock grant criteria, wherein said modifying the lock metadata is based at least in part on the lock manager detecting that the one or more concurrent lock grant criteria are satisfied with respect to the write lock on the first data object.

8. The computer-implemented method as recited in claim 7, wherein the one or more concurrent lock grant criteria indicate that (a) subsequent to an expiration of a validity period of a primary ownership of a write lock by a particular accessor and (b) prior to a reception of a lock release request with respect to the write lock, another accessor requesting the write lock is to be granted the primary ownership and the particular accessor is to be granted non-primary ownership of the write lock.

9. The computer-implemented method as recited in claim 8, further comprising:

in response to the determination that a first data object is unlocked, storing, by the lock manager, a first validity period of the primary ownership of the write lock; and transmitting, by the lock manager in response to the second write lock request, the first validity period, wherein the second write lock request is re-sent based at least in part on a detection that the first validity period has expired.

10. The computer-implemented method as recited in claim 6, wherein the first write lock request includes a first write sequence indicator, wherein the second write lock request includes a second write sequence indicator, wherein the write sequence indicators are utilized at the first data store to determine whether a particular write request is to be accepted, the computer-implemented method further comprising:

storing, by the lock manager, the first and second write sequence indicators in the lock metadata associated with the first data object; and determining, by the lock manager, based at least in part on comparing the first and second write sequence indicators, whether to terminate non-primary ownership of the write lock without receiving a request to release the write lock on behalf of the first accessor.

11. The computer-implemented method as recited in claim 10, further comprising:

receiving, by the lock manager, a lock release request on behalf of the second accessor, wherein said comparing is performed responsive to the lock release request.

12. The computer-implemented method as recited in claim 6, further comprising:

obtaining, by the lock manager via one or more programmatic interfaces, an unrequested release rule; and determining, by the lock manager, based at least in part on the unrequested release rule, whether to terminate a primary or non-primary ownership of the write lock without receiving a request to terminate the ownership.

13. The computer-implemented method as recited in claim 6, wherein the one or more data stores include a second data store, the computer-implemented method further comprising:

obtaining, by the lock manager via one or more programmatic interfaces, a target switch rule;

receiving, by the lock manager, another write lock request directed to the first data object on behalf of a third accessor, wherein the other lock request indicates the second data store as a target data store; and in response to detecting that the write lock associated with the first data object remains granted to at least one accessor with respect to the first data store, granting, by the lock manager, primary ownership of the write lock to the third accessor with respect to the first data store, without granting access to a write lock associated with the second data store.

14. The computer-implemented method as recited in claim 6, further comprising:

obtaining, at the lock manager, a lock release request from a primary owner of the write lock, wherein the lock release request includes a write sequence indicator of a successfully-completed write of the first data object; and terminating, by the lock manager, a non-primary ownership of the write lock based at least in part on the write sequence indicator.

15. The computer-implemented method as recited in claim 6, further comprising:

in response to obtaining, at the lock manager, an indication via one or more programmatic interfaces that a second data store has been selected as an authoritative data store for the first data object, initiating, by the lock manager, one or more cleanup operations of write locks granted for the first data object with respect to the first data store.

16. One or more non-transitory computer-accessible storage media storing program instructions that when executed on or across one or more processors cause the one or more processors to:

obtain, at a lock manager, a first write lock request directed to a first data object on behalf of a first accessor, wherein the first write lock request indicates a first data store of one or more data stores of a distributed system as a target data store;

in response to a determination that the first data object is unlocked, store, by the lock manager, lock metadata associated with the first data object indicating that the first accessor is a primary owner of a write lock on the first data object with respect to the first data store; and in response to a second write lock request directed to the first data object on behalf of a second accessor before the write lock has been released and based on a determination that a locking policy of the write lock has been satisfied, modify, by the lock manager, the lock metadata associated with the first data object to indicate at least (a) the second accessor as the primary owner of the write lock on the first data object with respect to the first data store and (b) the first accessor as a non-primary owner of the write lock on the first data object.

17. The one or more non-transitory computer-accessible storage media as recited in claim 16, storing further program instructions that when executed on or across the one or more processors cause the one or more processors to:

obtain, by the lock manager via one or more programmatic interfaces, one or more concurrent lock grant criteria, wherein the lock metadata is modified based at least in part on the lock manager detecting that the one or more concurrent lock grant criteria are satisfied with respect to the write lock on the first data object.

18. The one or more non-transitory computer-accessible storage media as recited in claim 16, wherein the lock metadata is modified based at least in part on a determination of a source from which the second accessor submits the second write lock request.

19. The one or more non-transitory computer-accessible storage media as recited in claim 16, wherein the lock metadata is modified based at least in part on analysis of a write sequence indicator included in a write lock request submitted by the other accessor.

20. The one or more non-transitory computer-accessible storage media as recited in claim 16, storing further program instructions that when executed on or across the one or more processors cause the one or more processors to:

terminate an ownership of the write lock on the first data object in response to determining a write sequence indicator of a successfully-completed write of the first data object at the first data store.

* * * * *